US012707291B2

(12) United States Patent
Guo et al.

(10) Patent No.: US 12,707,291 B2
(45) Date of Patent: Aug. 11, 2026

(54) CHANNEL ACCESS METHOD AND RELATED APPARATUS

(71) Applicant: HUAWEI TECHNOLOGIES CO., LTD., Shenzhen (CN)

(72) Inventors: Ziyang Guo, Shenzhen (CN); Peng Liu, Shenzhen (CN); Jiajun Luo, Shenzhen (CN); Xun Yang, Shenzhen (CN); Yunbo Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 333 days.

(21) Appl. No.: 18/541,641

(22) Filed: Dec. 15, 2023

(65) Prior Publication Data

US 2024/0129758 A1 Apr. 18, 2024

Related U.S. Application Data

(63) Continuation of application No. PCT/CN2022/098741, filed on Jun. 14, 2022.

(30) Foreign Application Priority Data

Jun. 17, 2021 (CN) ......................... 202110673131.6

(51) Int. Cl.
*H04W 24/02* (2009.01)
*H04L 5/00* (2006.01)
(Continued)

(52) U.S. Cl.
CPC ........... *H04W 24/02* (2013.01); *H04L 5/0053* (2013.01); *H04W 74/0808* (2013.01); *H04W 74/0866* (2013.01)

(58) Field of Classification Search
CPC . H04W 24/02; H04W 74/0816; H04W 24/08; H04W 72/0446; H04W 74/0808;
(Continued)

(56) References Cited

U.S. PATENT DOCUMENTS 10,805,931 B2 * 10/2020 Cho ...................... H04W 28/16
11,388,732 B2 * 7/2022 Sana .................... G06N 3/0442
(Continued)

FOREIGN PATENT DOCUMENTS

CN 109861720 A 6/2019
CN 111050413 A 4/2020
KR 20200081630 A 7/2020

OTHER PUBLICATIONS

Y. Yu, S. C. Liew and T. Wang, "Carrier-Sense Multiple Access for Heterogeneous Wireless Networks Using Deep Reinforcement Learning," 2019 IEEE Wireless Communications and Networking Conference Workshop (WCNCW), Marrakech, Morocco, Apr. 15-18, 2019, pp. 1-7, doi: 10.1109/WCNCW.2019.8902705.
(Continued)

*Primary Examiner* — Bailor C Hsu
(74) *Attorney, Agent, or Firm* — WOMBLE BOND DICKINSON (US) LLP

(57) ABSTRACT

In the method, an access point AP receives action information separately reported by N stations STAs, where N pieces of action information are used to determine a training result of a first neural network of each STA, and N is a positive integer. The AP determines the training result of the first neural network of each STA based on the N pieces of action information, and sends the training result of the first neural network of each STA to the corresponding STA. The training result of the first neural network of each STA is determined based on the action information reported by the N STAs, instead of only the action information of the STA. This can improve a prediction capability of the first neural network, help improve a capability of each STA to predict channel access behavior of another STA, and improve a system throughput and reduce a communication latency.

20 Claims, 10 Drawing Sheets

(51) Int. Cl.
*H04W 74/08* (2024.01)
*H04W 74/0808* (2024.01)

(58) Field of Classification Search
CPC .. H04W 74/0866; H04W 84/12; G06N 3/098; G06N 3/092; G06N 3/04; G06N 3/08; H04L 5/0053
See application file for complete search history.

(56) References Cited

U.S. PATENT DOCUMENTS

| | | | | |
|---|---|---|---|---|
| 11,641,579 | B1 * | 5/2023 | Mukherjee | H04W 48/18 370/329 |
| 2014/0119291 | A1 | 5/2014 | Lee et al. | |
| 2019/0021114 | A1 | 1/2019 | Barber | |
| 2021/0295176 | A1 * | 9/2021 | Jacobs | G06N 5/01 |
| 2022/0150727 | A1 * | 5/2022 | Pezeshki | H04W 24/08 |
| 2022/0167236 | A1 * | 5/2022 | Melodia | H04W 28/0967 |
| 2023/0354400 | A1 * | 11/2023 | Elshafie | H04W 72/20 |
| 2024/0063961 | A1 * | 2/2024 | Marzban | H04L 5/0048 |
| 2024/0414562 | A1 * | 12/2024 | Kotaru | H04W 24/02 |

OTHER PUBLICATIONS

Y. Yu, S. C. Liew and T. Wang, "Non-Uniform Time-Step Deep Q-Network for Carrier-Sense Multiple Access in Heterogeneous Wireless Networks," in IEEE Transactions on Mobile Computing, vol. 20, No. 9, Sep. 1, 2021, doi: 10.1109/TMC.2020.2990399. total 14 pages.

L. Zhang, H. Yin, Z. Zhou, S. Roy and Y. Sun, "Enhancing WiFi Multiple Access Performance with Federated Deep Reinforcement Learning," 2020 IEEE 92nd Vehicular Technology Conference (VTC2020—Fall), Victoria, BC, Canada, Nov. 18, 2020-Dec. 16, 2020, pp. 1-6, doi: 10.1109/VTC2020-Fall49728.2020.9348485.

Yiding Yu et al:"Deep-Reinforcement Learning Multiple Access for Heterogeneous Wireless Networks." arXiv:1712.00162v2 [cs.NI] Jul. 16, 2018. total 12 pages.

* cited by examiner

STA: station Packet: packet
CSMA/CA node: carrier sense multiple access/collision avoidance node

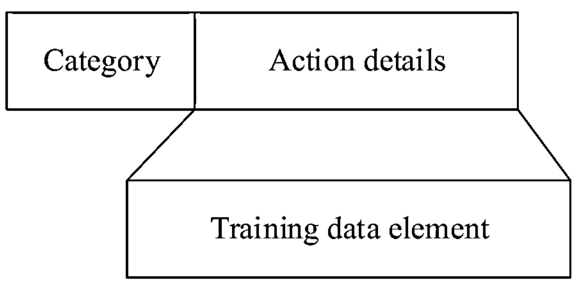

Category: category Action details: action details
Training data element: training data element

FIG. 4

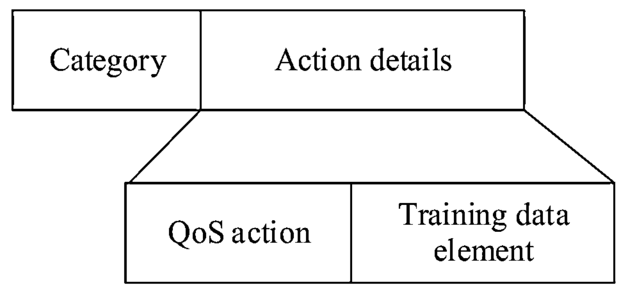

Category: category Action details: action details
Training data element: training data element
QoS action: quality of service action

FIG. 5

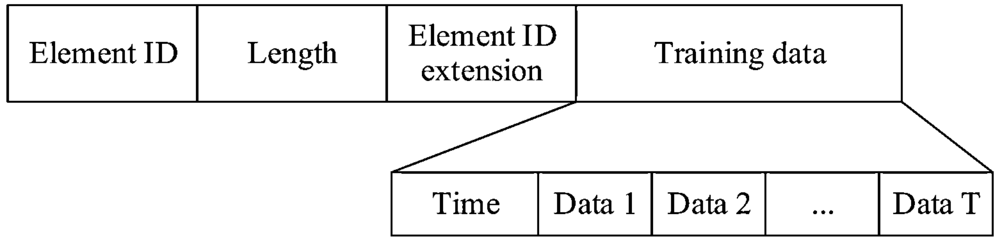

Length: length Training data: training data Element ID: element identification
Element ID extension: element identification extension

FIG. 6(a)

| Element ID | Length | Element ID extension | NN parameters or gradients |
|---|---|---|---|

Element ID: element identification Length: length
Element ID extension: element identification extension
NN parameters or gradients: neural network parameters or gradients

CHANNEL ACCESS METHOD AND RELATED APPARATUS

CROSS-REFERENCE TO RELATED APPLICATIONS

This application is a continuation of International Application No. PCT/CN2022/098741, filed on Jun. 14, 2022, which claims priority to Chinese Patent Application No. 202110673131.6, filed on Jun. 17, 2021. The disclosures of the aforementioned applications are hereby incorporated by reference in their entireties.

TECHNICAL FIELD

This application relates to the field of communication technologies, and in particular, to a channel access method and a related apparatus.

BACKGROUND

In a wireless network such as a short-range/wireless local area network (WLAN), a channel for data transmission is shared. If a plurality of stations (STAs) in a specific area send packets to a same access point (AP), a collision occurs, and data transmission fails.

Currently, a carrier sense multiple access (CSMA) or collision avoidance (CA) mechanism is used in a Wi-Fi system to avoid a collision on a shared channel. For example, when a packet arrives, a STA having a sensing capability senses a channel status within random duration. If the channel is in an idle state within the random duration, the STA accesses the channel.

The manner of avoiding the collision on the shared channel by using the CSMA/CA mechanism may be considered as a collision decomposition algorithm, that is, expecting to achieve collision decomposition effect through complete randomization. In other words, each STA in this manner does not have a capability of predicting whether another STA accesses the channel. Consequently, a system throughput is low and a latency is high.

SUMMARY

Embodiments of this application provide a channel access method and a related apparatus, to improve a system throughput and reduce a latency.

According to a first aspect, an embodiment of this application provides a channel access method. In the method, an access point AP receives action information separately reported by N stations STAs, where N pieces of action information are used to determine a training result of a first neural network of each STA. The AP determines the training result of the first neural network of each STA based on the N pieces of action information, and sends the training result of the first neural network of each STA to the corresponding STA.

It can be learned that, the training result of the first neural network of each STA is determined based on the action information reported by the N STAs, instead of only the action information of the STA. This can improve a prediction capability of the first neural network, help improve a capability of the STA to predict whether to access a channel, and improve a system throughput and reduce a delay.

In an embodiment, the action information indicates an action of a period of time, and the action is sending or skipping sending. The period of time is time between a moment at which the STA successfully reports action information last time and a current moment. In other words, the action is an action of sending or skipping sending a packet by the STA since the STA successfully reports the action information last time.

In an embodiment, the AP may further receive carrier sense result information or packet transmission result information separately reported by the N STAs. The carrier sense result information includes a carrier sense result, and the packet transmission result information includes a packet transmission result. Therefore, that the AP determines the training result of the first neural network of each STA based on the N pieces of action information is as follows: The AP determines the training result of the first neural network of each STA based on the N pieces of action information and the N pieces of carrier sense result information; or the AP determines the training result of the first neural network of each STA based on the N pieces of action information and the N pieces of packet transmission result information.

It can be learned that each STA may further report the carrier sense result information or the packet transmission result information to the AP. Therefore, the AP can directly train the first neural network of each STA based on the N pieces of action information and the N pieces of carrier sense result information, or train the first neural network of each STA based on the N pieces of action information and the N pieces of packet transmission result information, thereby helping reduce processing complexity of the AP.

In an embodiment, the training result is a neural network parameter or a gradient, and the neural network parameter/gradient is used by the corresponding STA to update the first neural network.

In an embodiment, when the AP receives the action information separately reported by the N STAs, the action information is carried in an action details field of a first frame reported by the STA. The action details field includes a time indication subfield, and a data 1 subfield to a data T subfield, where T is a positive integer.

The time indication subfield indicates a moment at which the STA successfully receives first response information last time. The first response information is response information sent when the AP successfully receives action information sent by the STA. In other words, the first response information is response information received when the STA successfully reports the action information last time, and the response information may be acknowledgment ACK information. The data 1 subfield indicates an action performed in a first slot after the STA successfully receives the first response information last time. In other words, the data 1 subfield indicates an action performed in a first slot after the STA successfully reports the action information last time. The data T subfield indicates an action performed in a $T^{th}$ slot after the STA successfully receives the first response information last time, and the $T^{th}$ slot is also a last slot before the STA currently reports the action information.

It can be learned that, for the N STAs, the action information reported by each STA is carried in the first frame, and the action information reported by each STA to the AP includes the moment at which the STA successfully reports the action information last time, and actions in the first slot to the $T^{th}$ slot after the action information is successfully reported last time.

In another embodiment, when the AP receives the action information separately reported by the N STAs, the action information is carried in an action details field of a first frame reported by the STA. The action details field includes a time indication subfield, an action 1 subfield, a time 1 subfield, . . . , an action P subfield, and a time P subfield, where P is a positive integer.

The time indication subfield indicates a moment at which the STA successfully receives first response information last time. The first response information is response information sent when the AP successfully receives action information sent by the STA. In other words, the time indication subfield indicates a moment at which the STA successfully reports the action information last time.

The action 1 subfield indicates a first action after the STA successfully receives the first response information last time. The action P subfield indicates a $P^{th}$ action between a moment at which the STA successfully receives the first response information last time and a current moment. In other words, the action 1 subfield indicates a first action after the STA successfully reports the action information last time, and the action P subfield indicates a last action between a moment at which the STA successfully reports the action information last time and the current moment.

The time 1 subfield indicates duration of the action 1 or end time of the action 1. The time P subfield indicates duration of the action P or end time of the action P. When the time 1 subfield indicates the duration of the action 1, and the time P subfield indicates the duration of the action P, different actions have different meanings represented by the duration. When the action is a sending action, the duration represents a packet length of a sent packet. When the action is a skipping sending action, the duration represents duration for skipping sending a packet.

It can be learned that, for the N STAs, the action information reported by each STA is carried in the first frame, and the action information reported by each STA to the AP includes the moment at which the STA successfully reports the action information last time, each action after the STA successfully reports the action information last time, and duration or end time of each action.

In still another embodiment, when the AP receives the action information separately reported by the N STAs, the action information is carried in an action details field of a first frame reported by the STA. The action details field includes a time 1 indication subfield, an action 1 subfield, . . . , a time P indication subfield, and an action P subfield, where P is a positive integer.

The action 1 subfield indicates a first action after the STA successfully receives first response information last time. The action P subfield indicates a $P^{th}$ action between a moment at which the STA successfully receives the first response information last time and a current moment. The first response information is response information sent when the AP successfully receives action information sent by the STA. In other words, the action 1 subfield indicates a first action after the STA successfully reports the action information last time, and the action P subfield indicates a last action between a moment at which the STA successfully reports the action information last time and the current moment. The time 1 indication subfield indicates start time of the action 1. The time P indication subfield indicates start time of the action P.

It can be learned that, for the N STAs, the action information reported by each STA is carried in the first frame, and the action information reported by each STA to the AP includes each action after the STA successfully reports the action information last time, and start time of each action.

In yet another embodiment, when the AP receives the action information separately reported by the N STAs, the action information is carried in an action details field of a first frame reported by the STA. The action details field includes a time 1 indication subfield, a duration 1 subfield, . . . , a time K indication subfield, and a duration K subfield, where K is a positive integer.

The time 1 indication subfield indicates start time/end time of an action 1. The action 1 is a sending action performed when the STA sends a packet for the first time and does not receive second response information after successfully receiving first response information last time. The first response information is response information sent when the AP successfully receives action information sent by the STA. The second response information is response information sent when the AP successfully receives the packet sent by the STA. The duration 1 subfield indicates duration of the action 1.

The time K indication subfield indicates start time/end time of an action K. The action K is a sending action performed when the STA sends a packet for the $K^{th}$ time and does not receive the second response information after successfully receiving the first response information last time. The duration K subfield indicates duration of the action K.

It can be learned that, for the N STAs, the action information reported by each STA is carried in the first frame, and the action information reported by each STA to the AP includes start time/end time of a sending action each time the STA sends a packet and fails after successfully reporting action information last time, and duration of the packet sent each time when the packet fails to be sent.

In still yet another embodiment, when the AP receives the action information separately reported by the N STAs, the action information is carried in an action details field of a first frame reported by the STA. The action details field includes a first time 1 indication subfield, a second time 1 indication subfield, . . . , a first time K indication subfield, and a second time K indication subfield, where K is a positive integer.

The first time 1 subfield indicates start time of an action 1. The first time K subfield indicates start time of an action K. The action 1 is a sending action performed when the STA sends a packet for the first time and does not receive second response information after successfully receiving first response information last time. The action K is a sending action performed when the STA sends a packet for the $K^{th}$ time and does not receive the second response information after successfully receiving the first response information last time. The first response information is response information sent when the AP successfully receives action information sent by the STA. The second response information is response information sent when the AP successfully receives the packet sent by the STA. In other words, the action 1 is an action that the corresponding STA fails to send the packet for the first time after successfully reporting the action information last time, and the action K is an action that the STA fails to send the packet for the $K^{th}$ time after successfully reporting the action information last time.

The second time 1 indication subfield indicates end time of the action 1. The second time K indication subfield indicates end time of the action K.

It can be learned that, for the N STAs, the action information reported by each STA is carried in the first frame, and the action information reported by each STA to the AP includes start time and end time of a sending action each time the STA sends a packet and fails after successfully reporting the action information last time.

In a further embodiment, when the AP receives the action information and the carrier sense result information that are separately reported by the N STAs, the action information and the carrier sense result information are carried in an action details field of a first frame reported by the STA. The action details field includes a time indication subfield, and a data 1 subfield to a data T subfield, where T is a positive integer.

The time indication subfield indicates a moment at which the STA successfully receives first response information last time. The first response information is response information sent when the AP successfully receives action information sent by the STA.

The data 1 subfield indicates a carrier sense result and an action performed in a first slot after the STA successfully receives the first response information last time. The data T subfield indicates a carrier sense result and an action performed in a $T^{th}$ slot after the STA successfully receives the first response information last time.

It can be learned that, for the N STAs, the action information and the carrier sense result information that are reported by each STA are carried in the first frame, and the information reported by each STA to the AP includes a moment at which the STA successfully reports the action information last time, and a carrier sense result and an action performed in each slot since the STA successfully reports the action information last time.

In a still further embodiment, when the AP receives the action information and the packet transmission result information that are separately reported by the N STAs, the action information and the packet transmission result information are carried in an action details field of a first frame reported by the STA. The action details field includes a time indication subfield, and a data 1 subfield to a data T subfield, where T is a positive integer.

The time indication subfield indicates a moment at which the STA successfully receives first response information last time. The first response information is response information sent when the AP successfully receives action information sent by the STA.

The data 1 subfield indicates a packet transmission result and an action performed in a first slot after the STA successfully receives the first response information last time. The data T subfield indicates a packet transmission result and an action performed in a $T^{th}$ slot after the STA successfully receives the first response information last time.

It can be learned that, for the N STAs, the action information and the packet transmission result information that are reported by each STA are carried in the first frame, and the information reported by each STA to the AP includes a moment at which the STA successfully reports the action information last time, and a packet transmission result and an action performed in each slot since the STA successfully reports the action information last time.

In an embodiment, that the AP determines the training result of the first neural network of each STA based on the N pieces of action information is as follows: The AP inputs status information of each STA into a first neural network of the corresponding STA, to obtain an output of the first neural network; the AP inputs the output of each first neural network into a second neural network, to obtain an output of the second neural network, where the output of the second neural network represents an expected reward within preset time; and the AP trains a third neural network based on the output of the second neural network and a reward function, and determines the training result of each first neural network by minimizing a loss function of the third neural network, where the third neural network includes each first neural network and the second neural network.

The status information of the STA is obtained based on the action information of the STA, a neural network parameter of the second neural network is obtained based on the N pieces of action information, and the reward function is determined based on the N pieces of action information.

Further, the status information of the STA is obtained based on the action information and the carrier sense result information of the STA, a neural network parameter of the second neural network is obtained based on the N pieces of action information and the N pieces of carrier sense result information, and the reward function is determined based on the N pieces of action information and the N pieces of carrier sense result information.

Alternatively, the status information of the STA is obtained based on the action information and the packet transmission result information of the STA, a neural network parameter of the second neural network is obtained based on the N pieces of action information and the N pieces of packet transmission result information, and the reward function is determined based on the N pieces of action information and the N pieces of packet transmission result information.

It can be learned that the AP first inputs, into the first neural network of the STA, the status information obtained based on the information reported by each STA, to obtain the output of each first neural network, then inputs outputs of N first neural networks into the second neural network, to obtain the output of the second neural network, and then trains the third neural network based on the loss function, to finally obtain the training result of the first neural network. The training result of the first neural network of each STA is determined based on the information reported by the N STAs, instead of only information of the STA. This helps improve a capability of each STA to predict channel access behavior of another STA.

In an embodiment, when determining, based on the N pieces of action information, that a first STA successfully sends a packet, the AP sets a value of the reward function to 1. The first STA is a STA in the N STAs that has a longest time interval between a moment at which the second response information is successfully received last time and the current moment.

It can be learned that, when determining, based on the information reported by the N STAs, that the STA that has the longest time interval since the packet is successfully sent last time, the AP sets the value of the reward function to 1.

In another embodiment, when determining, based on the N pieces of action information, that a second STA successfully sends a packet, the AP sets a value of the reward function to first duration minus 1. The second STA is a STA other than a first STA in the N STAs, and the first STA is a STA in the N STAs that has a longest time interval between a moment at which the second response information is successfully received last time and the current moment. The first duration is duration between a moment at which the second STA successfully receives the second response information last time and the current moment.

It can be learned that, when the AP determining, based on the information reported by the N STAs, that the STA other than the STA that has the longest time interval since the packet is successfully sent successfully sends the packet, the AP sets the value of the reward function to the time interval (since the STA successfully sends the packet last time) minus 1.

In still another embodiment, when determining, based on the N pieces of action information, that M STAs in the N STAs send packets in a same slot, the AP sets a value of the reward function to −1. M is a positive integer less than or equal to N. It can be learned that, when determining, based on the information reported by the N STAs, that some STAs in the N STAs send packets in a same slot, the AP sets the reward function to −1.

In yet another embodiment, when determining, based on the N pieces of action information, that none of the N STAs sends a packet in a same slot, the AP sets a value of the reward function to 0. It can be learned that, when determining, based on the information reported by the N STAs, that none of the N STAs sends the packet in the same slot, the AP sets the value of the reward function to 0.

In an embodiment, the N STAs share a neural network parameter. In this case, that the AP sends the training result of the first neural network of each STA to the corresponding STA is as follows: The AP broadcasts the training results of the first neural networks to the N STAs. It can be learned that, when the N STAs share the neural network parameter, the AP obtains the same training result by training each first neural network based on the information reported by the N STAs, and the AP can notify each STA of the training result through broadcasting, thereby reducing system signaling overheads.

In another embodiment, S STAs in the N STAs share a neural network parameter, where S is a positive integer less than or equal to N. That the AP sends the training result of the first neural network of each STA to the corresponding STA is as follows: The AP multicasts the training results of the first neural networks corresponding to the S STAs to the S STAs, and unicasts the training results of (N−S) first neural networks to the corresponding STAs. It can be learned that, when some STAs in the N STAs share the neural network parameter, the AP can notify, through multicasting, some STAs of the training results corresponding to the shared neural network parameters, and unicast, to other STAs in a unicast manner, the training results corresponding to the non-shared neural network parameters. In this manner, the training results of the STAs that share one neural network parameter are notified through multicasting, so that system overheads can also be reduced.

In still another embodiment, when the N STAs do not share a neural network parameter, the training result of each first neural network is unicast to the corresponding STA.

According to a second aspect, this application further provides a channel access method. The channel access method according to this aspect corresponds to the channel access method according to the first aspect, and the channel access method according to this aspect is described from a station STA side. In the method, a station STA reports action information to an access point AP, where the action information is used to determine a training result of a first neural network, and the first neural network is a neural network of the STA. The STA receives the training result of the first neural network from the AP, where the training result of the first neural network is obtained based on the action information, and the training result of the first neural network is used to update the first neural network, to determine whether the STA accesses a channel. The STA updates the first neural network based on the training result of the first neural network, and when sensing that the channel is idle, determines, based on an updated first neural network and current status information, whether to access the channel.

It can be learned that, in this embodiment of this application, the STA reports the action information to the AP, and receives the training result obtained by the AP by training the first neural network based on the action information, so that the STA updates the first neural network based on the training result, and when sensing that the channel is idle, determines, based on the updated first neural network and sensed action information, whether to access the channel. A training result for updating each first neural network is determined by the AP based on action information reported by N STAs, so that the first neural network has better predictability. When the STA determines, based on the updated first neural network, whether to access the channel, there is better accuracy of determining to access or skip accessing the channel. This improves a communication system throughput, and reduces a communication latency.

In an embodiment, the STA further reports carrier sense result information or packet transmission result information to the AP, where the carrier sense result information or the packet transmission result information is used to determine the training result of the first neural network. It can be learned that, in addition to reporting the action information to the AP, the STA may further report the carrier sense result information or the packet transmission result information to the AP, so that the AP can directly train the first neural network based on information reported by the N STAs, thereby reducing processing complexity of the AP.

In an embodiment, the training result is a neural network parameter or a gradient; and the carrier sense result information or the packet transmission result information is used to determine the training result of the first neural network.

In an embodiment, when the STA reports the action information, the action information is carried in an action details field of a first frame. The action details field includes a time indication subfield, and a data 1 subfield to a data T subfield, where T is a positive integer.

The time indication subfield indicates a moment at which the STA successfully receives first response information last time. The first response information is response information sent when the AP successfully receives action information sent by the STA. In other words, the first response information is response information received when the STA successfully reports the action information last time, and the response information may be acknowledgment ACK information. The data 1 subfield indicates an action performed in a first slot after the STA successfully receives the first response information last time. In other words, the data 1 subfield indicates an action performed in a first slot after the STA successfully reports the action information last time. The data T subfield indicates an action performed in a $T^{th}$ slot after the STA successfully receives the first response information last time, and the $T^{th}$ slot is also a last slot before the STA currently reports the action information.

It can be learned that, the action information reported by the STA is carried in the first frame, and the action information reported by the STA to the AP includes the moment at which the STA successfully reports the action information last time, and actions in the first slot to the $T^{th}$ slot after the action information is successfully reported last time.

In another embodiment, when the STA reports the action information, the action information is carried in an action details field of a first frame reported by the STA. The action details field includes a time indication subfield, an action 1 subfield, a time 1 subfield, . . . , an action P subfield, and a time P subfield, where P is a positive integer.

The time indication subfield indicates a moment at which the STA successfully receives first response information last time. The first response information is response information sent when the AP successfully receives action information sent by the STA. In other words, the time indication subfield indicates a moment at which the STA successfully reports the action information last time.

The action 1 subfield indicates a first action after the STA successfully receives the first response information last time. The action P subfield indicates a $P^{th}$ action between a moment at which the STA successfully receives the first response information last time and a current moment. In other words, the action 1 subfield indicates a first action after the STA successfully reports the action information last time, and the action P subfield indicates a last action between a moment at which the STA successfully reports the action information last time and the current moment.

The time 1 subfield indicates duration of the action 1 or end time of the action 1. The time P subfield indicates duration of the action P or end time of the action P. When the time 1 subfield indicates the duration of the action 1, and the time P subfield indicates the duration of the action P, different actions have different meanings represented by the duration. When the action is a sending action, the duration represents a packet length of a sent packet. When the action is a skipping sending action, the duration represents duration for skipping sending a packet.

It can be learned that, the action information reported by the STA is carried in the first frame, and the action information reported by the STA to the AP includes the moment at which the STA successfully reports the action information last time, each action after the STA successfully reports the action information last time, and duration or end time of each action.

In still another embodiment, when the STA reports the action information, the action information is carried in an action details field of a first frame reported by the STA. The action details field includes a time 1 indication subfield, an action 1 subfield, . . . , a time P indication subfield, and an action P subfield, where P is a positive integer.

The action 1 subfield indicates a first action after the STA successfully receives first response information last time. The action P subfield indicates a $P^{th}$ action between a moment at which the STA successfully receives the first response information last time and a current moment. The first response information is response information sent when the AP successfully receives action information sent by the STA. In other words, the action 1 subfield indicates a first action after the STA successfully reports the action information last time, and the action P subfield indicates a last action between a moment at which the STA successfully reports the action information last time and the current moment. The time 1 indication subfield indicates start time of the action 1. The time P indication subfield indicates start time of the action P.

It can be learned that, the action information reported by the STA is carried in the first frame, and the action information reported by the STA to the AP includes each action after the STA successfully reports the action information last time, and start time of each action.

In yet another embodiment, when the STA reports the action information, the action information is carried in an action details field of a first frame reported by the STA. The action details field includes a time 1 indication subfield, a duration 1 subfield, . . . , a time K indication subfield, and a duration K subfield, where K is a positive integer.

The time 1 indication subfield indicates start time/end time of an action 1. The action 1 is a sending action performed when the STA sends a packet for the first time and does not receive second response information after successfully receiving first response information last time. The first response information is response information sent when the AP successfully receives action information sent by the STA. The second response information is response information sent when the AP successfully receives the packet sent by the STA. The duration 1 subfield indicates duration of the action 1.

The time K indication subfield indicates start time/end time of an action K. The action K is a sending action performed when the STA sends a packet for the $K^{th}$ time and does not receive the second response information after successfully receiving the first response information last time. The duration K subfield indicates duration of the action K.

It can be learned that, the action information reported by the STA is carried in the first frame, and the action information reported by the STA to the AP includes start time/end time of a sending action each time the STA sends a packet and fails after successfully reporting action information last time, and duration of the packet each time when the packet fails to be sent.

In still yet another embodiment, when the STA reports the action information, the action information is carried in an action details field of a first frame reported by the STA. The action details field includes a first time 1 indication subfield, a second time 1 indication subfield, . . . , a first time K indication subfield, and a second time K indication subfield, where K is a positive integer.

The first time 1 subfield indicates start time of an action 1. The first time K subfield indicates start time of an action K. The action 1 is a sending action performed when the STA sends a packet for the first time and does not receive second response information after successfully receiving first response information last time. The action K is a sending action performed when the STA sends a packet for the $K^{th}$ time and does not receive the second response information after successfully receiving the first response information last time. The first response information is response information sent when the AP successfully receives action information sent by the STA. The second response information is response information sent when the AP successfully receives the packet sent by the STA. In other words, the action 1 is an action that the corresponding STA fails to send the packet for the first time after successfully reporting the action information last time, and the action K is an action that the STA fails to send the packet for the $K^{th}$ time after successfully reporting the action information last time.

The second time 1 indication subfield indicates end time of the action 1. The second time K indication subfield indicates end time of the action K.

It can be learned that, the action information reported by the STA is carried in the first frame, and the action information reported by the STA to the AP includes start time and end time of a sending action each time the STA sends a packet and fails after successfully reporting the action information last time.

In a further embodiment, when the STA reports the action information and the carrier sense result information, the action information and the carrier sense result information are carried in an action details field of a first frame reported by the STA. The action details field includes a time indication subfield, and a data 1 subfield to a data T subfield, where T is a positive integer.

The time indication subfield indicates a moment at which the STA successfully receives first response information last time. The first response information is response information sent when the AP successfully receives action information sent by the STA.

The data 1 subfield indicates a carrier sense result and an action performed in a first slot after the STA successfully receives the first response information last time. The data T subfield indicates a carrier sense result and an action performed in a $T^{th}$ slot after the STA successfully receives the first response information last time.

It can be learned that, the action information and the carrier sense result information that are reported by the STA are carried in the first frame, and the information reported by the STA to the AP includes a moment at which the STA successfully reports the action information last time, and a carrier sense result and an action performed in each slot since the STA successfully reports the action information last time.

In a still further embodiment, when the STA reports the action information and the packet transmission result information, the action information and the packet transmission result information are carried in an action details field of a first frame reported by the STA. The action details field includes a time indication subfield, and a data 1 subfield to a data T subfield, where T is a positive integer.

The time indication subfield indicates a moment at which the STA successfully receives first response information last time. The first response information is response information sent when the AP successfully receives action information sent by the STA.

The data 1 subfield indicates a packet transmission result and an action performed in a first slot after the STA successfully receives the first response information last time. The data T subfield indicates a packet transmission result and an action performed in a $T^{th}$ slot after the STA successfully receives the first response information last time.

It can be learned that, the action information and the packet transmission result information that are reported by the STA are carried in the first frame, and the information reported by the STA to the AP includes a moment at which the STA successfully reports the action information last time, and a packet transmission result and an action performed in each slot since the STA successfully reports the action information last time.

In an embodiment, that the STA updates the first neural network based on the training result of the first neural network, and when sensing that the channel is idle, determines, based on the updated first neural network and the current status information of the STA, whether to access the channel is as follows: The STA inputs the current status information of the STA into the updated first neural network, to output a first value and a second value, where the first value represents an expected reward obtained by accessing the channel, and the second value represents an expected reward obtained by skipping accessing the channel; and when the first value is greater than the second value, the STA determines to access the channel; or when the first value is less than the second value, the STA determines to skip accessing the channel.

It can be learned that, when sensing that the channel is idle, the STA inputs the sensed action information to the updated first neural network, to obtain the expected reward for accessing the channel and the expected reward for skipping accessing the channel, and determines, when the expected reward for accessing the channel is greater than the expected reward for skipping accessing the channel, to access the channel.

According to a third aspect, this application further provides a communication apparatus. The communication apparatus has some or all functions of implementing the AP according to the first aspect, or has some or all functions of implementing the STA according to the second aspect. For example, functions of the communication apparatus may have the functions of the AP according to some or all embodiments of the first aspect of this application, or may have a function of independently implementing any embodiment of this application. The function may be implemented by hardware, or may be implemented by hardware executing corresponding software. The hardware or the software includes one or more units or modules corresponding to the functions.

In an embodiment, a structure of the communication apparatus may include a processing unit and a communication unit. The processing unit is configured to support the communication apparatus in performing a corresponding function in the foregoing method. The communication unit is configured to support communication between the communication apparatus and another communication apparatus. The communication apparatus may further include a storage unit. The storage unit is configured to be coupled to the processing unit and the communication unit, and the storage unit stores program instructions and data that are necessary for the communication apparatus.

In an embodiment, the communication apparatus includes:

the communication unit, configured to receive action information separately reported by N stations STAs, where N pieces of action information are used to determine a training result of a first neural network of each STA, and N is a positive integer; and the processing unit, configured to determine the training result of the first neural network of each STA based on the N pieces of action information, where the communication unit is further configured to send the training result of the first neural network of each STA to the corresponding STA.

In addition, for another embodiment of the communication apparatus in this aspect, refer to related content of the first aspect. Details are not described herein again.

In another embodiment, the communication apparatus includes:

the communication unit, configured to report action information to an access point AP, where the action information is used to determine a training result of a first neural network of the processing unit, where the communication unit is further configured to receive the training result of the first neural network from the AP, where the training result of the first neural network is used to update the first neural network, to determine whether the processing unit accesses a channel; and the processing unit, configured to: update the first neural network based on the training result of the first neural network, and when sensing that the channel is idle, determine, based on an updated first neural network and current status information of the processing unit, whether to access the channel.

In addition, for another embodiment of the communication apparatus in this aspect, refer to related content of the second aspect. Details are not described herein again.

For example, the communication unit may be a transceiver or a communication interface, the storage unit may be a memory, and the processing unit may be a processor.

In an embodiment, the communication apparatus includes:

the transceiver, configured to receive action information separately reported by N stations STAs, where N pieces of action information are used to determine a training result of a first neural network of each STA, and N is a positive integer; and the processor, configured to determine the training result of the first neural network of each STA based on the N pieces of action information, where the transceiver is further configured to send the training result of the first neural network of each STA to the corresponding STA.

In addition, for another embodiment of the communication apparatus in this aspect, refer to related content of the first aspect. Details are not described herein again.

In another embodiment, the communication apparatus includes:

the transceiver, configured to report action information to an access point AP, where the action information is used to determine a training result of a first neural network of the processor, where the transceiver is further configured to receive the training result of the first neural network from the AP, where the training result of the first neural network is used to update the first neural network, to determine whether the processor accesses a channel; and the processor, configured to: update the first neural network based on the training result of the first neural network, and when sensing that the channel is idle, determine, based on an updated first neural network and current status information of the processor, whether to access the channel.

In addition, for another embodiment of the communication apparatus in this aspect, refer to related content of the second aspect. Details are not described herein again.

In another embodiment, the communication apparatus is a chip or a chip system. The processing unit may also be represented as a processing circuit or a logic circuit. The communication unit may be an input/output interface, an interface circuit, an output circuit, an input circuit, a pin, a related circuit, or the like on the chip or the chip system.

In an embodiment process, the processor may be configured to perform, for example, but not limited to, baseband related processing; and the transceiver may be configured to perform, for example, but not limited to, radio frequency receiving and sending. The foregoing components may be separately disposed on chips that are independent of each other, or at least some or all of the components may be disposed on a same chip. For example, the processor may be divided into an analog baseband processor and a digital baseband processor. The analog baseband processor and a transceiver may be integrated on a same chip, and the digital baseband processor may be disposed on an independent chip. With continuous development of integrated circuit technologies, an increasing quantity of components may be integrated onto a same chip. For example, a digital baseband processor and a plurality of application processors (including but not limited to a graphics processing unit, a multimedia processor, and the like) may be integrated onto a same chip. Such a chip may be referred to as a system-on-a-chip (SoC). Whether the components are separately disposed on different chips or integrated and disposed on one or more chips usually depends on a requirement of a product design. Implementation forms of the foregoing components are not limited in this embodiment of this application.

According to a fourth aspect, this application further provides a processor, configured to perform the foregoing methods. In a process of performing these methods, a process of sending the foregoing information and a process of receiving the foregoing information in the foregoing methods may be understood as a process of outputting the foregoing information by the processor and a process of receiving the foregoing input information by the processor. When outputting the information, the processor outputs the information to a transceiver, so that the transceiver performs transmission. After the information is output by the processor, other processing may further need to be performed on the information before the information arrives at the transceiver. Similarly, when the processor receives the foregoing input information, the transceiver receives the foregoing information, and inputs the foregoing information into the processor. Further, after the transceiver receives the foregoing information, other processing may need to be performed on the foregoing information before the information is input into the processor.

Based on the foregoing principle, for example, the reporting action information mentioned in the foregoing method may be understood as that the processor outputs action information.

Unless otherwise specified, or if operations such as transmitting, sending, and receiving related to the processor do not contradict an actual function or internal logic of the operations in related descriptions, all the operations may be more generally understood as operations such as outputting, receiving, and inputting of the processor, instead of operations such as transmitting, sending, and receiving directly performed by a radio frequency circuit and an antenna.

In an embodiment process, the processor may be a processor specially configured to perform these methods, or a processor, for example, a general-purpose processor, that executes computer instructions in a memory to perform these methods. The memory may be a non-transitory memory, for example, a read-only memory (ROM). The memory and the processor may be integrated on a same chip, or may be separately disposed on different chips. A type of the memory and a manner of disposing the memory and the processor are not limited in this embodiment of this application.

According to a fifth aspect, this application further provides a communication system. The system includes at least one AP and at least two STAs in the foregoing aspects. In another embodiment, the system may further include another device that interacts with the AP and the STA in the solutions provided in this application.

According to a sixth aspect, this application provides a computer-readable storage medium, configured to store instructions. When the instructions are executed by a communication apparatus, the method according to any one of the first aspect and the second aspect is implemented.

According to a seventh aspect, this application further provides a computer program product including instructions. When the computer program product runs on a communication apparatus, the communication apparatus is enabled to perform the method according to any one of the first aspect or the second aspect.

According to an eighth aspect, this application provides a chip system. The chip system includes a processor and an interface. The interface is configured to obtain a program or instructions. The processor is configured to invoke the program or the instructions to implement or support an AP in implementing a function in the first aspect, or is configured to invoke the program or the instructions to implement or support a STA in implementing a function in the second aspect, for example, determining or processing at least one of data and information in the foregoing method. In an embodiment, the chip system further includes a memory. The memory is configured to store program instructions and data that are necessary for a terminal. The chip system may include a chip, or may include a chip and another discrete component.

According to a ninth aspect, this application provides a communication apparatus including a processor, configured to execute a computer program or executable instructions stored in a memory, where when the computer program or the executable instructions are executed, the apparatus is enabled to perform the method according to any one of the first aspect and the embodiments of the first aspect.

In an embodiment, the processor and the memory are integrated together.

In another embodiment, the memory is located outside the communication apparatus.

According to a tenth aspect, this application provides a communication apparatus including a processor, configured to execute a computer program or executable instructions stored in a memory, where when the computer program or the executable instructions are executed, the apparatus is enabled to perform the method according to any one of the second aspect and the embodiments of the second aspect.

In an embodiment, the processor and the memory are integrated together.

In another embodiment, the memory is located outside the communication apparatus.

BRIEF DESCRIPTION OF DRAWINGS

FIG. 4 is a schematic diagram of a frame structure according to an embodiment of this application;

FIG. 5 is a schematic diagram of another frame structure according to an embodiment of this application;

FIG. 6(*b*) is a schematic diagram of another training data element format according to an embodiment of this application;

FIG. 6(*c*) is a schematic diagram of still another training data element format according to an embodiment of this application;

FIG. 6(*d*) is a schematic diagram of yet another training data element format according to an embodiment of this application;

FIG. 6(*e*) is a schematic diagram of a further training data element format according to an embodiment of this application;

DESCRIPTION OF EMBODIMENTS

The following clearly and completely describes technical solutions in embodiments of this application with reference to the accompanying drawings in embodiments of this application.

To better understand a channel access method disclosed in embodiments of this application, a communication system to which embodiments of this application are applicable is first described.

1. Communication System

Figure 1:
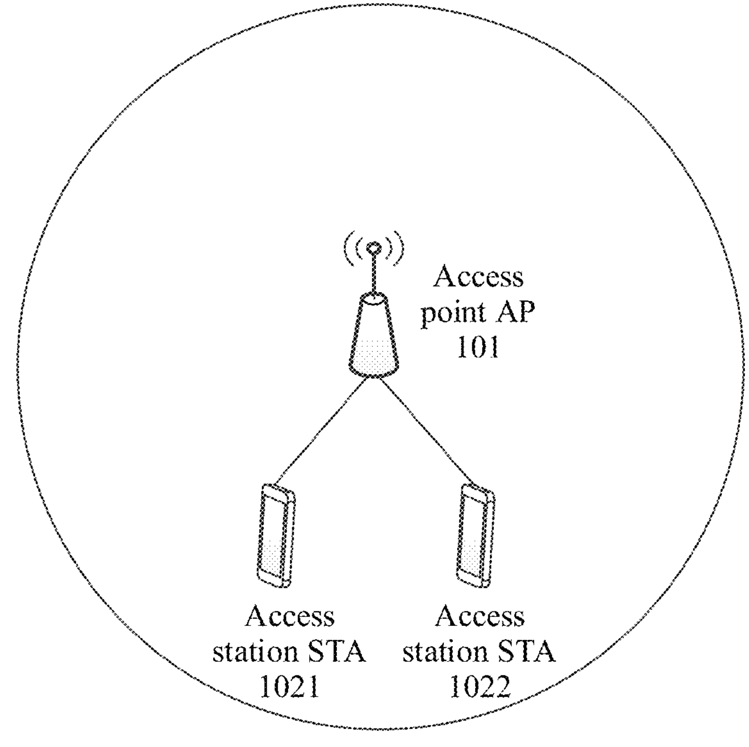
FIG. 1 is a schematic diagram of a structure of a communication system according to an embodiment of this application.

FIG. 1 is a schematic diagram of a structure of a communication system according to an embodiment of this application. The communication system may include but is not limited to one access point (AP), two stations (STAs). Quantities and forms of devices shown in FIG. 1 are used as examples and do not constitute a limitation on embodiments of this application. In actual application, two or more APs and more than two STAs may be included. The communication system shown in FIG. 1 is described by using an example in which an AP 101, a STA 1021, and a STA 1022 are used, and the AP 101 can provide a wireless service for the STA 1021 and the STA 1022. In FIG. 1, an example in which the AP 101 is a base station, and the STA 1021 and the STA 1022 are mobile phones is used.

In this embodiment of this application, the communication system may be a wireless local area network (WLAN), a cellular network, or another wireless communication system that supports parallel transmission on a plurality of links. Embodiments of this application are mainly described by using a network in which IEEE 802.11 is deployed as an example. Various aspects in this application may be extended to other networks that use various standards or protocols, for example, Bluetooth, high-performance radio LAN (HIPERLAN) (a wireless standard similar to the IEEE 802.11 standard, mainly used in Europe), a wide area network (WAN), a personal area network (PAN), or another network that is known or developed in the future. Therefore, the various aspects provided in this application are applicable to any appropriate wireless network regardless of coverage and wireless access protocols.

In embodiments of this application, the STA has a wireless receiving and sending function, and may support 802.11 series protocols, and communicate with an AP or another STA. For example, the STA may be any user communication device that allows a user to communicate with an AP and further communicate with a WLAN, including but not limited to, user equipment that can be connected to a network, such as a tablet computer, a desktop computer, a laptop computer, a notebook computer, an ultra-mobile personal computer (UMPC), a handheld computer, a netbook, a personal digital assistant (PDA), or a mobile phone, or an internet of things node in internet of things, or a vehicle-mounted communication apparatus in internet of vehicles, or the like. In an embodiment, the STA may alternatively be a chip and a processing system in the foregoing terminals.

The AP in embodiments of this application is an apparatus that provides a service for a STA, and may support the 802.11 series protocols. For example, the AP may be a communication entity such as a communication server, a router, a switch, or a bridge. Alternatively, the AP may include various forms of macro base stations, micro base stations, relay stations, and the like. Certainly, the AP may alternatively be chips and processing systems in these various forms of devices, to implement the methods and functions in embodiments of this application.

For ease of understanding of embodiments disclosed in this application, the following two points are described.

(1) In embodiments disclosed in this application, a scenario of a wireless local area network (e.g., Wireless Fidelity (Wi-Fi)) network in a wireless communication network is used as an example for description. It should be noted that the solutions in embodiments disclosed in this application are applied to another wireless communication network, and a corresponding name may be replaced with a name of a corresponding function in the another wireless communication network.

(2) Aspects, embodiments, or features of this application are presented in embodiments disclosed in this application by describing a system that includes a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

2. Technical Problems to be Resolved by this Application

Figure 2:
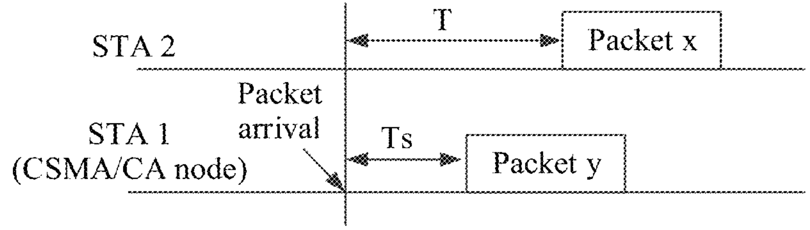
FIG. 2 is a schematic diagram of avoiding a channel collision by using a CSMA/CA mechanism according to an embodiment of this application.

Currently, a carrier sense multiple access (CSMA) or collision avoidance (CA) mechanism is used in a communication system to avoid a collision on a shared channel. That is, as shown in FIG. 2, when a packet arrives, a STA 1 (namely, a CSMA/CA node) having a sensing capability performs channel access by using a random backoff mechanism, that is, senses a channel status within random duration (Ts). If a channel is in an idle state within the random duration, the STA accesses the channel, that is, sends a packet y (namely, the packet y). However, only when a STA 2 having the same sensing capability senses a channel, and time T for the STA 2 to sense the channel is not equal to Ts, a collision does not occur between the STA 1 and the STA 2, that is, the STA 1 can successfully send the packet. In other words, if the sensing time T of the STA 2 is equal to the sensing time of the STA 1, both the STA 1 and the STA 2 consider that the channel is idle within the sensing time, and both determine to access the channel. That is, the STA 1 and the STA 2 send packets at the same time, the STA 1 sends a packet x, and the STA 2 sends the packet y, which causes the collision between the STA 1 and the STA 2 on the shared channel. As a result, neither the STA 1 nor the STA 2 can successfully send the packet.

The CSMA/CA mechanism may be considered as a collision decomposition algorithm, that is, expecting to achieve collision decomposition effect through complete randomization. In other words, each STA in this manner does not have a capability of predicting whether another STA accesses the channel. Consequently, a system throughput is low and a latency is high. In addition, as a quantity of STAs in a network increases, collisions in the network increase, and consequently, average backoff time of the STA increases. This causes a long transmission latency, and a large latency jitter. In addition, the research shows that a theoretical upper limit of a CSMA/CA capacity is about 85%, that is, 15% collisions still exist between the STAs in the best case. In addition, a configuration parameter of the STA also has great impact on actual performance. The research shows that a system capacity is generally 70% to 80%. In other words, when a collision between the STAs is resolved by using the CSMA/CA mechanism in a communication system, a throughput is low.

Artificial intelligence (AI) technologies are widely used in the wireless communication field to improve communication performance and user experience. Reinforcement learning (RL) is an AI technology appropriate for channel access problems, and learns in an exploration process in which an intelligent agent (network node) takes an action (sending or skipping sending) in an environment (a wireless network) to find an optimal policy to maximize an expected reward (a throughput). Characteristics of online learning and modeless optimization of RL make it have a better generalization capability than that in a conventional model-based optimization method.

In embodiments of this application, an RL technology is combined with channel access. The AP trains, by using a reinforcement learning method, a neural network corresponding to each STA based on action information reported by N STAs, to obtain a training result of the neural network corresponding to each STA, so that each STA can determine, based on the training result, whether to access a channel, thereby improving a capability of the STA to predict whether to access the channel.

3. Channel Access Method 100 (Each STA Reports Action Information to the AP)

Figure 3:
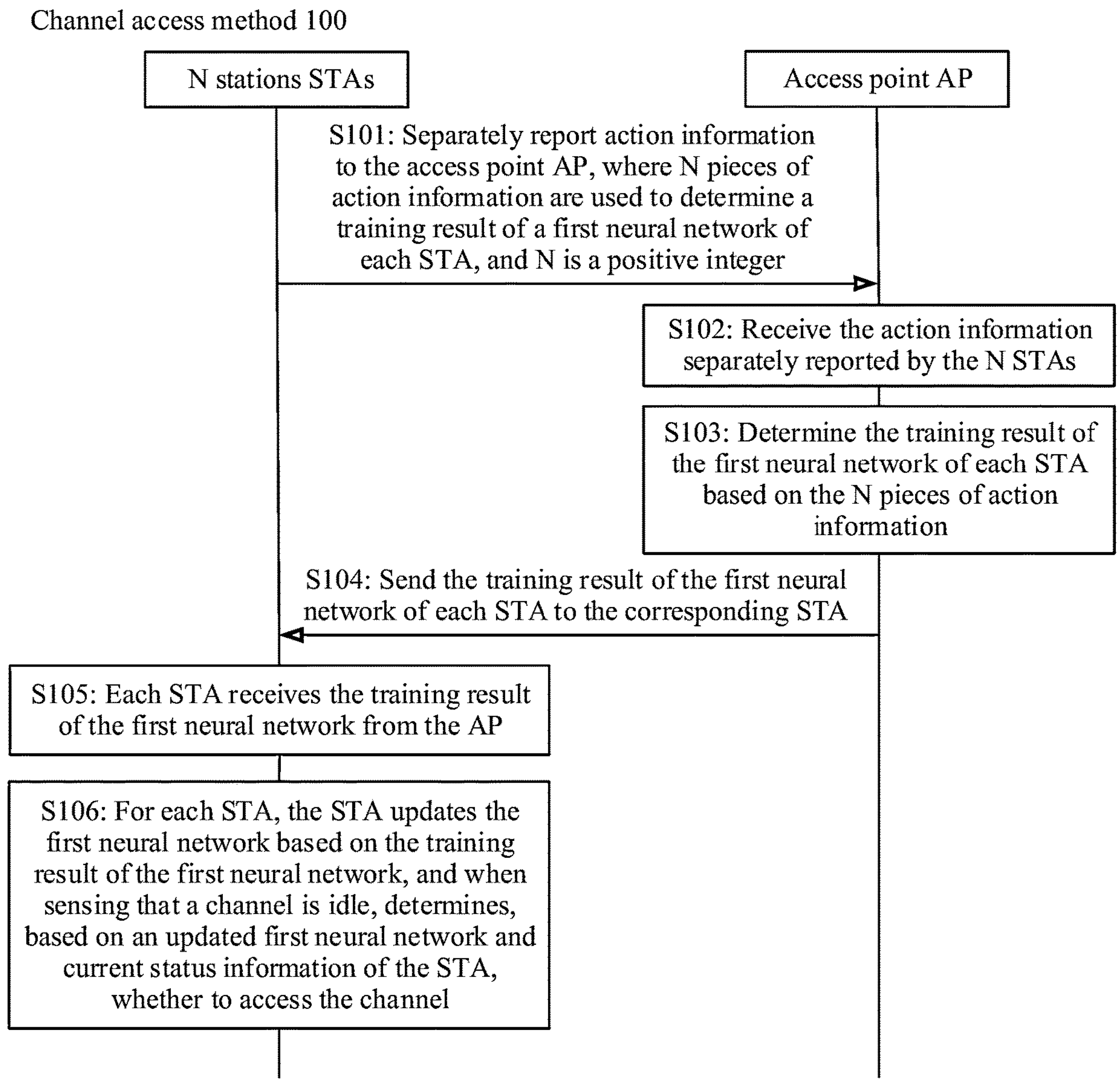
FIG. 3 is a schematic interaction diagram of a channel access method according to an embodiment of this application.
Figure 6B:
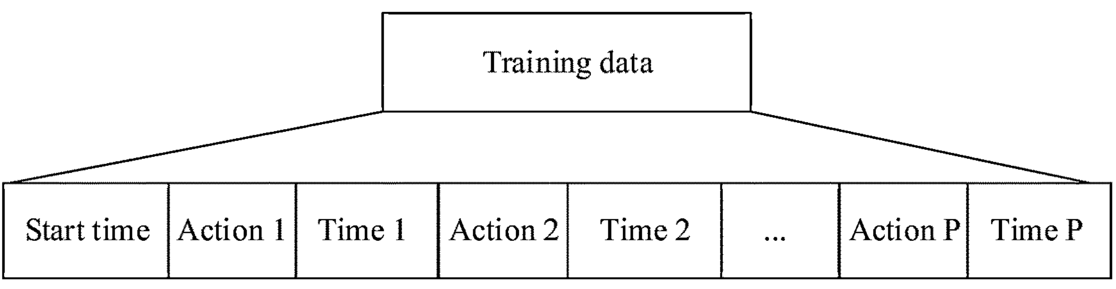
FIG. 6(*a*) is a schematic diagram of a training data element format according to an embodiment of this application.
Figure 6C:
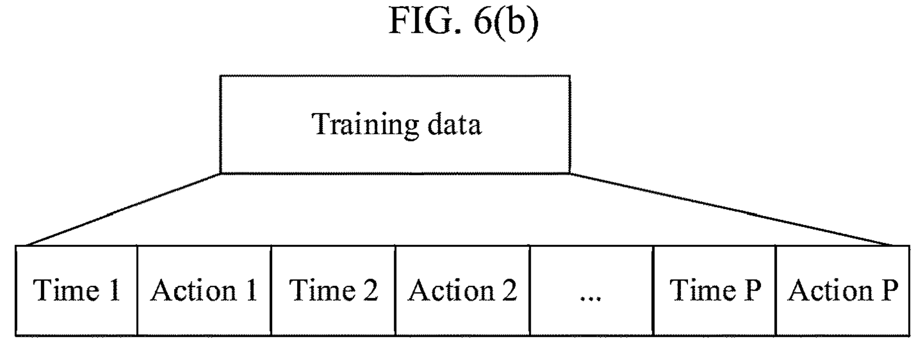
Figure 6D:
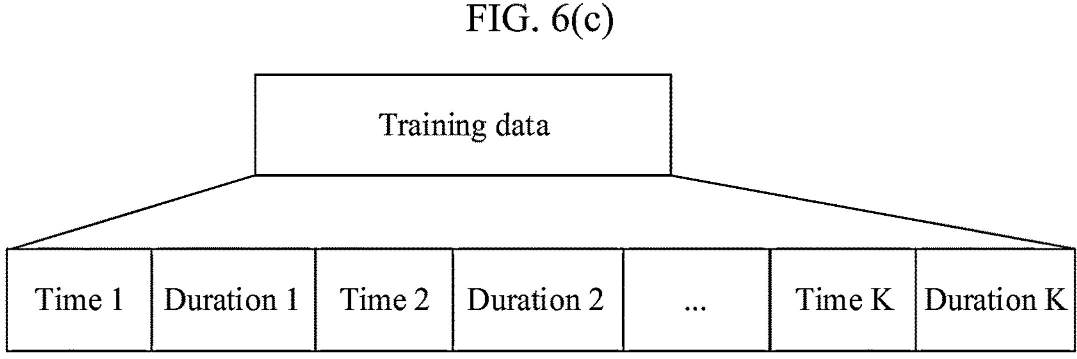
Figure 6E:
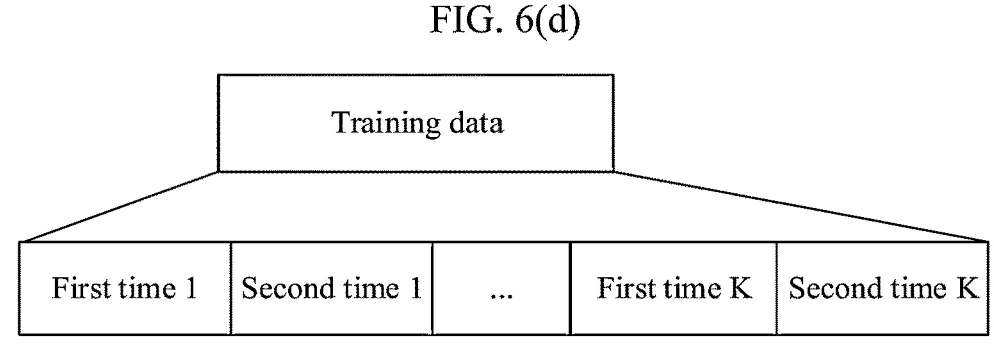

An embodiment of this application provides the channel access method 100. FIG. 3 is a schematic interaction diagram of the channel access method 100. The channel access method 100 is described from a perspective of interaction between the AP and the STAs. The channel access method 100 includes but is not limited to the following operations.

S101: N stations STAs separately report the action information to the access point AP, where N pieces of action information are used to determine a training result of a first neural network of each STA, and N is a positive integer.

The AP corresponds to M STAs, and M is a positive integer greater than N. The N STAs are STAs that successfully report the action information to the AP in the M STAs. For example, an AP #1 in a communication system corresponds to 10 STAs, and eight STAs in the 10 STAs successfully report action information to the AP, in other words, the AP #1 receives the action information reported by the eight STAs in the 10 STAs. In this case, N is equal to 8.

For the N STAs, each STA reports one piece of action information to the AP. Therefore, the N STAs report the N pieces of action information. The action information indicates an action of a period of time, and the action is sending or skipping sending. The period of time includes a plurality of slots. The plurality of slots are a plurality of slots between a moment at which the STA successfully reports action information last time and a current moment. For example, a STA 1 successfully reports the action information last time at a moment to, and the current moment is a moment t1. In this case, the plurality of slots are a plurality of slots between t0 and t1. In other words, the action information reported by each STA includes an action in the plurality of slots. The action information reported by each STA may be represented by $$a_t^i,$$

where t and i each are a positive integer, and $$a_t^i$$

represents action information of a STA i in a $t^{th}$ slot, that is, whether the STA i sends a packet in the $t^{th}$ slot.

In addition, the action information is carried in a first frame reported by the STA. It may be understood that each STA uses the first frame of the STA to carry the action information, and then reports the first frame to the AP. The first frame includes a category field and an action details field. The category field indicates a category of the first frame, and the action details field indicates the action information reported by the STA.

In an embodiment, the first frame is a management frame newly added by the STA. For example, the STA adds a management frame, namely, a frame 1, where the frame 1 is used to carry the action information. A frame structure of the frame 1 is shown in FIG. 4. The frame 1 includes a category field and an action details field. The category field indicates a category of the frame 1, the action details field indicates the action information, and the action information is carried in a training data element subfield.

In another embodiment, the first frame is a frame in existing management frames in a protocol. For example, the first frame is a quality of service (QoS) action frame, and a frame structure of the first frame is shown in FIG. 5. In this case, a category, of the first frame, indicated by a category field is a QoS action frame, and a QoS action subfield in an action details field follows the category field. The STA uses an unused value in the QoS action field to indicate the to-be-reported action information, that is, indicates content of a training data element subfield in the action details field. For example, the QoS action field includes two bits, and values 00, 01, and 11 represented by the two bits of the QoS action field are used, but a value 10 is not used. In this case, the STA uses the value 10 to indicate the to-be-reported action information, that is, uses the value 10 to indicate the content of the training data element.

For an element format of the training data element indicating the action information, refer to FIG. 6(*a*). As shown in FIG. 6(*a*), the training data element includes an element identification (ID) subfield, a length subfield, an element ID extension subfield, and a training data subfield. When all values in the current element ID subfield are used, the element ID subfield and the element ID extension subfield jointly indicate an ID of training data. The length subfield indicates a length of the training data. The training data indicates the action information reported by the STA.

When an element format of training data in the first frame corresponding to each STA is different, content of the action information reported by the STA is also different. With reference to an element format of training data, the following describes several embodiments of the action details field, that is, describes embodiments of the action information.

1. The action details field includes a time indication subfield, and a data 1 subfield to a data T subfield, where T is a positive integer.

For an element format of training data, refer to FIG. 6(*a*). The training data includes time, data 1 to data T. The action details field includes the time indication subfield, and the data 1 subfield to the data T subfield.

The time indication subfield indicates a moment at which the STA successfully receives first response information last time, and the time indication subfield may be implemented by using a timestamp, a sequence number, or the like. The first response information is response information sent when the AP successfully receives an action information sent by the STA. For example, the first response information is acknowledgment (ACK) information. That is, if the STA receives the first response information, it indicates that the STA successfully reports the action information. Therefore, the time indication subfield indicates time at which the STA successfully reports action information last time.

The data 1 subfield indicates an action in a first slot after the STA successfully receives the first response information last time. In other words, the data 1 subfield indicates an action of the STA in a first slot since the STA successfully reports the action information last time. The data T subfield indicates an action performed in a $T^{th}$ slot after the STA successfully receives the first response information last time. In other words, the data T subfield indicates an action performed by the STA in a $T^{th}$ slot since the STA successfully reports the action information last time.

In other words, when each STA reports the action information to the AP, the STA reports time at which the STA successfully reports the action information last time and an action in each slot since the STA successfully reports the action information last time, so that the AP obtains an action sensed by each STA in each slot since the STA successfully reports the action information last time.

2. The action details field includes a time indication subfield, an action 1 subfield to an action P subfield, . . . , and a time 1 subfield to a time P subfield, where P is a positive integer.

For an element format of training data, refer to FIG. 6(*b*). Different from that in FIG. 6(*a*), the training data includes start time, an action 1, time 1, . . . , an action P, and time P. In this case, the action details field includes the time indication subfield, the action 1 subfield, the time P subfield, . . . , the action P subfield, and the time P subfield.

The time indication subfield indicates a receiving moment at which the STA successfully receives first response information last time. The first response information is response information sent when the AP successfully receives action information sent by the STA. In this case, the time indication subfield indicates a moment at which the STA successfully reports the action information last time.

The action 1 subfield indicates a first action after the STA successfully receives the first response information last time. In other words, the action 1 subfield indicates a first action after the STA successfully reports the action information last time. The time 1 subfield indicates duration of the action 1 or end time of the action 1. The action P subfield indicates a $P^{th}$ action between a current moment and a moment at which the STA successfully receives the first response information last time. In other words, the action P subfield indicates a $P^{th}$ action between a current moment and a moment after the STA successfully reports the action information last time. The time P subfield indicates duration of the action P or end time of the action P.

It may be understood that the action 1 is the first action after the STA successfully reports the action information last time. When the time 1 subfield indicates the duration of the action 1 and the time P subfield indicates the duration of the action P, and when the action 1 does not change, the duration 1 is continuously accumulated; or when the action 1 changes, an action 2 is added, and duration 2 of the action 2 is recorded, until a last action (namely, the action P) before the current moment is recorded. The STA reports the recorded action information to the AP, that is, reports, to the AP, the moment at which the action information is successfully reported last time, the action 1 and the duration of the action 1, the action 2 and the duration of the action 2, . . . , and the action P and the duration of the action P.

For example, if the STA 1 does not send a packet in a first slot after the action information is successfully reported last time, the action 1 is recorded as skipping sending. If the STA 1 does not send a packet in a first slot to a third slot, the duration 1 is accumulated as three slots. In a fourth slot, the STA 1 changes the action of skipping sending a packet to sending a packet, and the STA 1 adds the action 2, where the action 2 is sending. If the action of sending a packet lasts until the current moment (a ninth slot), the STA 1 records the duration 2 of the action 2 as six slots. Therefore, the action information reported by the STA 1 to the AP includes the time at which the STA 1 successfully reports the action information last time, the action 1 is skipping sending, and the duration for skipping sending is three slots, and the action 2 is sending, and duration for sending is six slots.

In other words, each STA reports time at which the STA successfully reports action information last time, a plurality of actions performed by the STA from a moment at which the STA successfully reports the action information last time to a current moment, and duration of each action or end time of each action. This implementation helps the AP learn of action behavior of each STA in each slot since the STA successfully reports the action information last time.

3. The action information field includes a time 1 indication subfield, an action 1 subfield, . . . , a time P indication subfield, and an action P subfield, where P is a positive integer.

For an element format of training data, refer to FIG. 6(*c*). Different from that in FIG. 6(*a*) and FIG. 6(*b*), the training data includes time 1, an action 1, time 2, an action 2, . . . , time P, and an action P. In this case, the action details field includes the time 1 indication subfield, the action 1 subfield, . . . , the time P indication subfield, and the action P subfield.

The time 1 indication subfield indicates start time of the action 1. The action 1 subfield indicates a first action performed after the STA successfully receives first response information last time. The first response information is response information sent when the AP successfully receives action information sent by the STA. In this case, the action 1 subfield indicates the first action performed after the STA successfully reports the action information last time. The time P indication subfield indicates start time of the action P. The action P subfield indicates a $P^{th}$ action between a current moment and a moment at which the STA successfully receives the first response information last time. In other words, the action P subfield indicates a $P^{th}$ action between a current moment and a moment at which the STA successfully sends the action information last time.

It may be understood that the action 1 is the first action after the STA successfully reports the action information last time, and the time 1 marks the start time of the action 1. If the action 1 changes, the STA records the action 2 and start time (the time 2) of the action 2, until a last action in a plurality of actions from the current moment to the moment at which the action information is successfully reported last time and start time of the action (the action P and the time P) are recorded, and the STA reports the recorded action information to the AP.

In other words, each STA reports, to the AP, start time of each action and each action that occurs since the STA successfully reports action information last time, so that the AP can obtain, based on the action reported by the STA and the start time of the action, behavior information about sending or skipping sending a packet by the STA in a plurality of slots.

4. The action information field includes a time 1 indication subfield, a duration 1 subfield, . . . , a time K indication subfield, and a duration K subfield, where K is a positive integer.

An element format of training data may be shown in FIG. 6(*d*). Different from that in FIG. 6(*a*) to FIG. 6(*c*), the training data includes time 1, duration 1, time 2, duration 2, . . . , time K, and duration K. In this case, the action details field includes the time 1 indication subfield, the duration 1 subfield, . . . , the time K indication subfield, and the duration K subfield.

The time 1 indication subfield indicates start time/end time of an action 1. The action 1 is a sending action performed when the STA sends a packet for the first time and does not receive second response information after successfully receiving first response information last time. The first response information is response information sent when the AP successfully receives action information sent by the STA, and the second response information is response information sent when the AP successfully receives the packet sent by the STA. In this case, the action 1 is an action performed when the STA sends the packet for the first time but fails to send the packet after successfully reporting the action information last time. The duration 1 subfield indicates duration of the action 1. In other words, the duration 1 subfield indicates a packet length of the packet sent through the action 1.

The time K indication subfield indicates start time/end time of an action K. The action K is a sending action performed when the STA sends a packet for the $K^{th}$ time and does not receive the second response information after successfully receiving the first response information last time. In this case, the action K is an action performed when the STA sends the packet for the $K^{th}$ time but fails to send the packet after successfully reporting the action information last time. The duration K subfield indicates duration of the action K. In other words, the duration K subfield indicates a packet length of the packet sent through the action K.

This is because the AP cannot learn of which STAs attempt to access a channel only when a plurality of STAs send packets at the same time and a channel collision occurs. Therefore, each STA only needs to report the action information to the AP when failing to send a packet, that is, each STA reports a sending action performed when failing to send the packet, start time/end time of the action, and a packet length of the packet sent each time, so that the AP learns which STAs attempt to access the channel when the channel collision occurs.

5. The action information field includes a first time 1 indication subfield, a second time 1 indication subfield, . . . , a first time K indication subfield, and a second time K indication subfield, where K is a positive integer.

For an element format of training data, refer to FIG. 6(*e*). Different from that in FIG. 6(*a*) to FIG. 6(*d*), the training data includes first time 1, second time 1, . . . , first time K, and second time K. In this case, the action details field includes the first time 1 indication subfield, the second time 1 indication subfield, . . . , the first time K indication subfield, and the second time K indication subfield.

The first time 1 indication subfield indicates start time of an action 1. The action 1 is a sending action performed when the STA sends a packet for the first time and does not receive second response information after successfully receiving first response information last time. The first response information is response information sent when the AP successfully receives action information sent by the STA, and the second response information is response information sent when the AP successfully receives the packet sent by the STA. In this case, the action 1 is an action performed when the STA sends the packet for the first time but fails to send the packet after successfully reporting the action information last time. The second time 1 indication subfield indicates end time of the action 1.

The first time K subfield indicates start time of an action K. The action K is a sending action performed when the STA sends a packet for the $K^{th}$ time and does not receive the second response information after successfully receiving the first response information last time. In this case, the action K is an action performed when the STA sends the packet for the $K^{th}$ time but fails to send the packet after successfully reporting the action information last time. The second time K indication subfield indicates end time of the action K.

It can be learned that the action 1 to the action K are actions performed when the STA fails to send a packet after successfully reporting the action information last time. In this case, each STA reports, to the AP, start time and end time when packet sending fails each time after the action information is successfully reported last time, so that the AP can determine, based on the start time and the end time when packet sending fails each time, a slot in which packet sending fails each time and a packet length of a sent packet, and further obtain behavior information of each STA in each slot.

It can be learned that different format elements of the foregoing five training data fields represent different content in the action information reported by each STA, so that the action information reported by the STA to the AP is more flexible.

It may be understood that time at which each STA reports the action information to the AP is predefined by the AP. For example, the AP predefines that each STA reports the action information to the AP based on a preset period, and then each STA reports the action information to the AP at an interval of the preset period. In addition, report time predefined by the AP for each STA may be different. For example, the AP predefines that a STA 1 reports action information to the AP at an interval of preset time 1, and predefines that a STA 2 reports action information to the AP at an interval of preset time 2.

In an embodiment, the time at which each STA reports the action information to the AP is notified by the AP to each STA by using signaling. For example, the AP notifies, by using downlink control information (DCI), each STA of the time for reporting the action information. For another example, the AP notifies, by using DCI #1, a STA 1 of time #1 at which the STA 1 reports action information, and notifies, by using DCI #2, a STA 2 of time #2 at which the STA 2 reports action information.

S102: The AP receives the action information separately reported by the N STAs.

S103: The AP determines a training result of a first neural network of each STA based on the N pieces of action information.

It may be understood that the AP trains the first neural network of each STA based on the N pieces of action information, to obtain the training result of the first neural network of each STA. For example, five STAs report five pieces of action information in total, and the five STAs respectively correspond to a first neural network #1 to a first neural network #5. The AP trains the first neural network #1 of a STA 1 based on the five pieces of action information, to obtain a training result of the first neural network #1, and trains a first neural network #2 of a STA 2 based on the five pieces of action information, to obtain a training result of the first neural network #2, until a training result of the first neural network #5 of a STA 5 is obtained.

Figure 7:
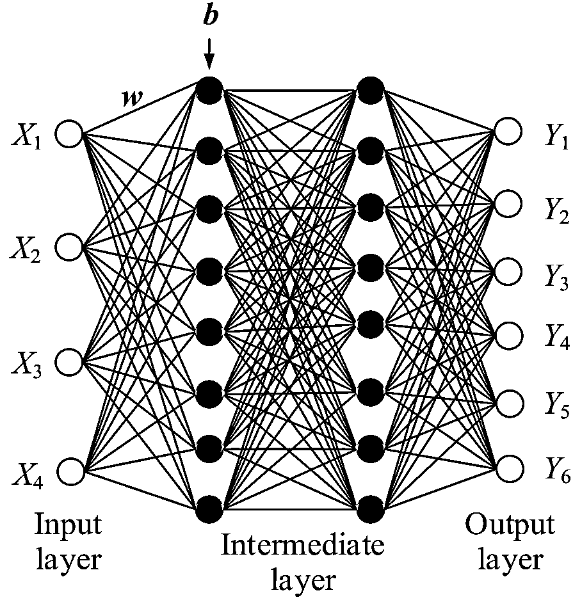
FIG. 7 is a schematic diagram of a structure of a neural network according to an embodiment of this application.

It may be understood that the training result of the first neural network is a neural network parameter or a gradient of the first neural network. The neural network parameter is a weight and an offset of a neuron in the first neural network. For example, a structure of a first neural network is shown in FIG. 7. The first neural network includes an input layer, an output layer, and a plurality of intermediate layers, and each layer includes a plurality of nodes. The nodes are referred to as neurons. Neurons at two adjacent layers are connected to each other.

For neurons at two adjacent layers, an output h of a neuron at a lower layer is a value obtained by performing an activation function on a weighted sum of all neurons x at an upper layer that are connected to the neuron at the lower layer. The output may be expressed by using a matrix as follows:

$$h = f(wx + b) \quad (1)$$

w is a weight matrix, b is a bias vector, and $f$ is the activation function. In this case, an output y of an $n^{th}$ layer neural network may be recursively expressed as follows:

$$y = f_n(w_n f_{n-1}(\ldots) + b_n) \quad (2)$$

In other words, the first neural network may be understood as a mapping relationship from the input x to the output y. A training process of the neural network is a process of obtaining the mapping relationship from existing data, namely, a process of obtaining w and b. The training result of the first neural network may be neural network parameters w and b.

In addition, the AP may train the neural network by using a gradient descent method. Therefore, the training result of the neural network may be the gradient. The gradient is a bias of a loss function of the neural network to the neural network parameter, namely, a bias of the loss function of the neural network to w and b.

The neural network parameter/gradient is used by a corresponding STA to update a corresponding first neural network, that is, a neural network parameter/gradient of a STA is used to update a first neural network of the STA. For example, if a neural network parameter #1 is a neural network parameter corresponding to a STA 1, the neural network parameter #1 is used by the STA 1 to update a first neural network of the STA 1.

In an embodiment, that the AP determines the training result of the first neural network of each STA based on the N pieces of action information is as follows: The AP inputs status information of each STA into a first neural network of the corresponding STA, to obtain an output of the first neural network; the AP inputs the output of each first neural network into a second neural network, to obtain an output of the second neural network, where the output of the second neural network represents an expected reward within preset time; and the AP trains a third neural network based on the output of the second neural network and a reward function, and determines the training result of each first neural network by minimizing a loss function of the third neural network, where the third neural network includes each first neural network and the second neural network.

The status information of the STA is obtained based on the action information of the STA, a neural network parameter of the second neural network is obtained based on the N pieces of action information, and the reward function is determined based on the N pieces of action information.

It may be understood that, after obtaining the action information reported by each STA, the AP determines carrier sense result information or packet transmission result information based on each piece of action information, and then determines the status information based on the N pieces of action information and the N pieces of carrier sense result information, or determines the status information based on the N pieces of action information and the N pieces of packet transmission result information. The carrier sense result information or the packet transmission result information includes $$o_t^i,\ l_t^i,\ d_t^i,\ \text{and}\ d_t^{-i}.$$

When $$a_t^i = 0,$$

it represents skipping sending; or when $$a_t^i = 1,$$

it represents sending.

$$o_t^i$$

represents a carrier sense result or a packet transmission result. For $$o_t^i,\ \text{when}\ d_t^i = 0,\ o_t^i$$

represents the carrier sense result, that is, represents the carrier sense result of a STA i in a $t^{th}$ slot, and $$O_t^i = 0$$

represents that a channel is idle, or $$o_t^i = 1$$

represents that a channel is busy. For $$o_t^i,\ \text{when}\ d_t^i = 1,\ o_t^i$$

represents the packet transmission result information, that is, represents a result of sending a packet by a STA i in a $t^{th}$ slot, and $$o_t^i = 0$$

represents that the packet is sent successfully, or $$o_t^i = 1$$

represents that the packet fails to be sent. In other words, $$o_t^i$$

may represent different meanings based on values of $$d_t^i.$$

When $$a_t^i = 0,$$

it represents the carrier sense result, or when $$a_t^i = 1,$$

it represents the packet transmission result.

$$l_t^i\ \text{represents duration of}\ a_t^i\ \text{and}\ o_t^i.\ d_t^i$$

represents duration between a moment at which the STA i receives previous second response information and the $t^{th}$ slot.

$$d_t^{-i}$$

represents duration between a moment at which a STA j receives previous second response information and the $t^{th}$ slot, where the STA j is any STA other than the STA i.

Figure 8:
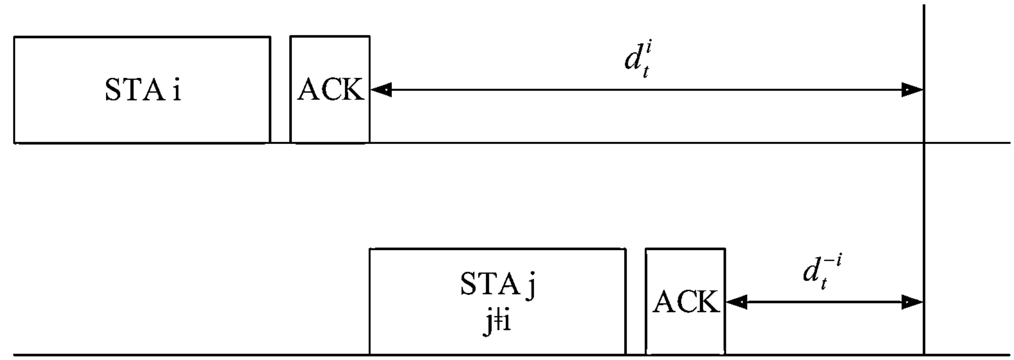
FIG. 8 is a schematic diagram of sensing a channel according to an embodiment of this application.

As shown in FIG. 8, $$d_t^i$$

represents the duration between the moment at which the STA i receives the previous second response information and the $t^{th}$ slot, that is, $$d_t^i$$

represents duration between a current moment and a moment at which the STA i successfully sends the packet last time.

$$d_t^{-i}$$

represents the duration between the moment at which the STA j receives the previous second response information and the $t^{th}$ slot, where the STA j is any STA other than the STA i, that is, $$d_t^{-i}$$

represents duration between the current moment and time when the any STA other than the STA i successfully sends a packet last time.

$$d_t^i \text{ and } d_t^{-i}$$

may be obtained by the STA i by sensing a response on the channel. When the STA i senses the response indicating that the STA successfully sends the packet, $$d_t^i = 0;$$

or when the STA i does not sense the response indicating that the STA successfully sends the packet, $d_t^i = d_t^i + 1$, that is, the duration between the current moment and the time when the STA i successfully sends the packet last time continues to be added. When the STA i senses a response of the channel to another STA, $$d_t^{-i} = 0;$$

or when the STA i does not sense the response of the channel to another STA, $$d_t^{-i} = d_t^{-i} + 1,$$

that is, the duration between the current moment and time when the any STA other than the STA i successfully sends the packet last time continues to be added.

It can be learned that the AP first inputs, into the first neural network of the STA, the status information obtained based on the information reported by each STA, to obtain the output of each first neural network, then inputs outputs of N first neural networks into the second neural network, to obtain the output of the second neural network, and then trains the third neural network based on the loss function, to finally obtain the training result of the first neural network. The training result of the first neural network of each STA is determined based on the information reported by the N STAs, instead of only information of the STA. This helps improve a capability of each STA to predict channel access behavior of another STA.

A process of training performed by the AP is described below by using an example in which the AP trains each first neural network by using a target Q neural network.

Figure 9:
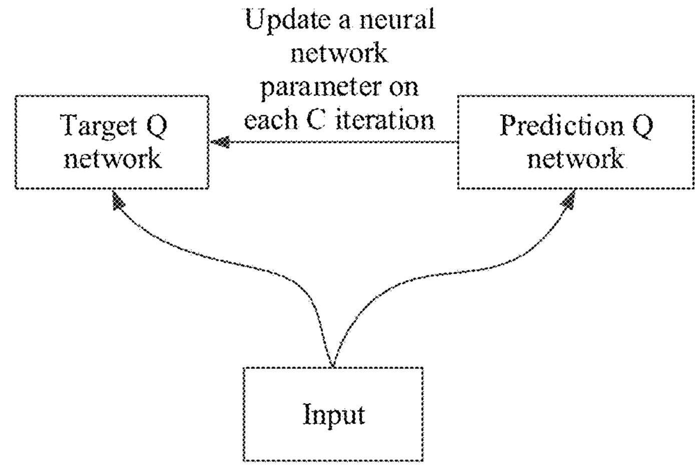
FIG. 9 is a schematic diagram of a structure of neural network training according to an embodiment of this application.
Figure 10:
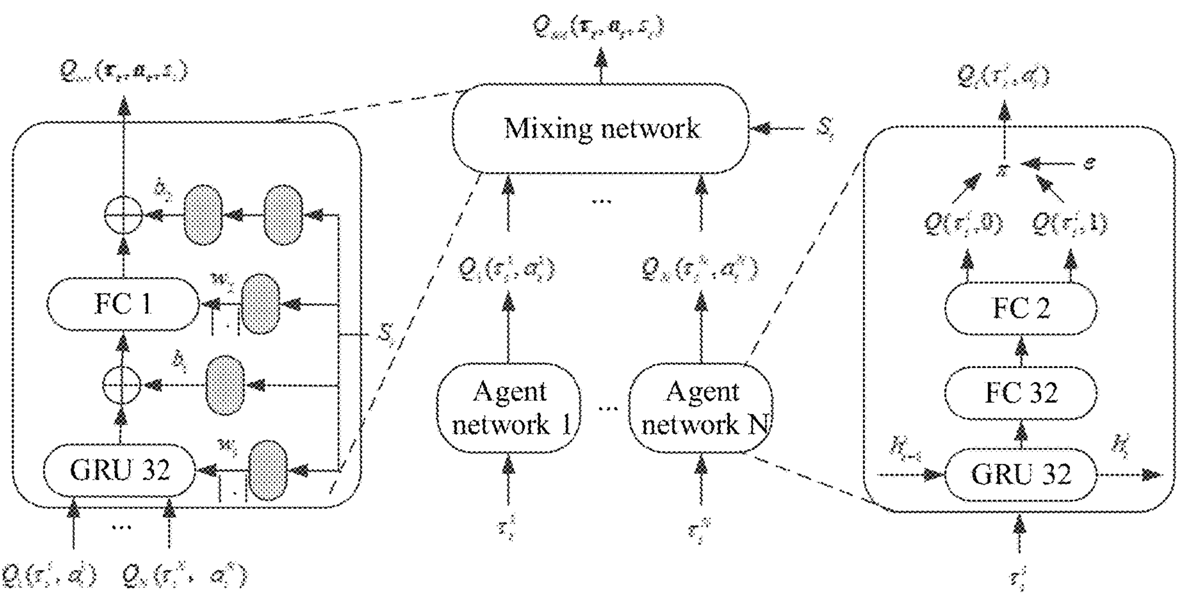
FIG. 10 is a schematic diagram of a structure of a neural network according to an embodiment of this application.

FIG. 9 is a schematic diagram of training of the target Q network. In FIG. 9, the target Q network and a prediction Q network are included. Structures of the target Q network and the prediction Q network are shown in FIG. 10. A neural network shown in FIG. 10 includes an agent network 1 to an agent network N, and a mixing network. The agent network 1 to the agent network N are first neural networks of a STA 1 to a STAN, that is, each agent network corresponds to one STA. The mixing network is the foregoing second neural network.

An input of each agent network is status information of a corresponding STA in a past period of time, namely, $$t_t^i, \textit{where } t_t^i = [c_{t-T+1}^i, \ldots c_{t-1}^i, c_t^i], t_t^i$$

represents status information of the STA i at consecutive T moments before the current moment t, and the status information of each STA is obtained based on the action information reported by the STA. The action information reported by the STA is $$a_t^i,$$

the AP obtains $$o_t^i, l_t^i, d_t^i, \text{ and } d_t^{-i} \text{ based on } a_t^i$$

of the STA, so that the STA obtains the status information, namely, $$c_{t+1}^i = (a_t^i, o_t^i, l_t^i, d_t^i, d_t^{-i})$$

of the STA based on $$a_t^i, o_t^i, l_t^i, d_t^i, \text{ and } d_t^{-i}.$$

First, the AP inputs the status information of each STA into the corresponding agent network, to obtain an output of the agent network, where the output of the agent network is $$Q_i(t_t^i,\ a_t^i).$$

Each agent network includes a gated recurrent unit (GRU), fully connected neural networks (FCs), and a module p. After the status information of each STA passes through the GRU and the FCs, the module p selects an action based on a ∈-greedy algorithm, to determine $$Q_i(t_t^i,\ a_t^i),\ \text{where}\ Q_i(t_t^i,\ a_t^i)$$

represents the expected reward of STA i within the preset time. Then, the AP uses the output of each agent network as an input of the mixing network, to obtain the output of the second neural network, where the output of the second neural network is $Q_{tot}(t_t, a_t, s_t)$. The mixing network is used to summarize the outputs of the N agent networks. The output, of the second neural network, obtained by the AP represents an expected reward of the entire network within preset time. In addition, the neural network parameter of the second neural network is obtained based on the N pieces of action information, that is, the neural network parameter of the second neural network is determined based on the N pieces of action information. In FIG. 10, a GRU 32 indicates that a hidden state of the GRU has 32 neurons, an FC 32 indicates that the FC has 32 neurons, and likewise, an FC 2 indicates that the FC has two neurons.

The AP calculates the loss function of the third neural network based on the output of the mixing network and the reward function, and trains the third neural network by minimizing the loss function, that is, trains each agent network and the mixing network, to determine the neural network parameter of each agent network. The loss function of the third neural network is as follows:

$$L(q) = \frac{1}{|E|}\sum_{e(t).E}[r(t) + g\max Q_{tot}(t_{t+1}, a_{t+1}, s_{t+1}; q^-) - Q_{tot}(t_t, a_t, s_t; q)]^2 \tag{3}$$

r(t) represents the reward function, $g$ represents a discount factor, generally g=0.9, $e_t$ represents experience, E represents an experience pool, |E| represents a quantity of experience $e_t$ in the experience pool, $e(t)=(s_t, t_t, a_t, r_t, s_{t+1}, t_{t+1})$, $$t_t = [t_t^1, t_t^2, \ldots, t_t^N],\ a_t = [a_t^1, a_t^2, \ldots, a_t^N],$$

$$s(t) = [d_t^1, d_t^2, \ldots, d_t^N, a_t^1, a_t^2, \ldots, a_t^N],$$

and $Q_{tot}(t_{t+1}, a_{t+1}, s¢\ q^-)$ represent outputs of the target Q network in FIG. 8, $q^-$ is a neural network parameter of the target Q network, $Q_{tot}(t_t, a_t, s; q)$ represents an output of the prediction Q network in FIG. 8, $q$ is a neural network parameter of the prediction Q network, and the neural network parameter is the mixing network is determined by s(t).

For a process of training the third neural network by the AP, refer to the schematic diagram shown in FIG. 9. That is, the AP updates the neural network parameter of the Q network by using a small-batch gradient descent method. It may be understood that the AP fixes $q^-$ each time, and then trains the neural network parameter $q$ of the prediction neural network by using the loss function and the output of the mixing network. Each time training is completed for C times, the neural network parameter $q$ is used as a fixed parameter $q^-$ of the target neural network, and then the neural network parameter of the prediction Q network is iteratively trained. Training data of each agent network is determined by minimizing the loss function of the third neural network. Generally, C=100.

There are the following several embodiments for calculating the reward function of the third neural network:

1. Set the Reward Function of the Third Neural Network to 1.

It may be understood that when determining, based on the action information, that a first STA successfully sends a packet, the AP sets the reward function of the third neural network to 1. The first STA is a STA in the N STAs that has the longest time interval between a moment at which second response information is successfully received last time and the current moment, that is, the first STA is a STA that has the longest duration from the moment at which the packet is successfully sent last time.

In other words, when the AP determines, based on the N pieces of action information, that the STA that has the longest duration from the time when the packet is successfully sent last time successfully sends the packet successfully in the plurality of slots, the reward function is set to 1. That is, $r_t=1$, $$i = argmax([d_t^1, d_t^2, \ldots\ d_t^N]),\ d_t^i$$

represents the duration between the moment at which the STA i receives the previous second response information and the $t^{th}$ slot, and arg max represents that i corresponding to a maximum value in values is selected.

2. Set the Reward Function to First Duration Minus 1.

It may be understood that when determining, based on the N pieces of action information, that a second STA successfully sends a packet, the AP sets the reward function to the first duration minus 1, that is, $$r_t = d_t^j - 1,\ \text{where}\ j_{„} argmax([d_t^1, d_t^2, \ldots\ d_t^N]).$$

The second STA is a STA other than the first STA in the N STAs, and the first STA is a STA in the N STAs that has the longest time interval between a moment at which second response information is successfully received last time and the current moment. The first duration is duration between a moment at which the second STA successfully receives the second response information last time and the current moment. In other words, when the AP determines, based on the N pieces of action information, that a STA, other than the STA, that has the longest duration from the moment at which the packet is successfully sent last time successfully sends the packet in a slot of a plurality of slots, the AP sets the reward function to the first duration minus 1.

3. Set the Reward Function to −1.

It may be understood that when determining, based on the N pieces of action information, that M STAs in the N STAs send packets in a same slot, the AP sets the reward function to −1, that is, $r_t=-1$. M is a positive integer less than or equal to N. In other words, when the AP determines, based on the N pieces of action information, that some STAs of the N STAs send packets in a same slot, it indicates that a channel collision occurs when some STAs send packets in the slot, and some STAs cannot successfully send the packets, that is, the reward function is subtracted, for example, the reward function is subtracted by 1.

4. Set the Reward Function to 0.

It may be understood that, when determining, based on the N pieces of action information, that none of the N STAs sends a packet in one slot, the AP sets the reward function to 0, that is, $r_t=0$. In other words, when the AP determines, based on the N pieces of action information, that none of all the STAs sends the packet in one slot, there is no future expected reward, and therefore the reward function is set to 1.

Further, in addition to the foregoing four cases, the AP may also set the reward function to 0.

In this embodiment of this application, if each STA reports the action information at different time, or some STAs of the N STAs report the action information at different time, when the AP trains the neural network at the current moment, some STAs may not report the action information, and only some STAs report the latest action information. In this case, when training the neural network of each STA, the AP trains the first neural network of each STA by using the action information reported at the current moment and action information reported last time by the STA that does not report action information at the current moment, to implement centralized training of the first neural network of each STA. In addition, in this manner, a STA whose action information does not change at the current moment does not need to report the action information, thereby reducing signaling overheads of a communication system.

Compared with that in a current solution in which a STA trains a neural network of the STA based on sending behavior and packet transmission duration observed by the STA, in this embodiment of this application, the AP trains the first neural network of each STA based on the N pieces of action information of the N STAs, that is, the AP refers to the action information of the N STAs when training the first neural network of each STA, so that the AP can train each first neural network better, and can obtain a better training result. This makes a prediction capability of the first neural network better.

S104: The AP sends the training result of the first neural network of each STA to the corresponding STA.

S105: For each STA, the STA receives the training result of the first neural network from the AP.

S106: For each STA, the STA updates the first neural network based on the training result of the first neural network, and when sensing that the channel is idle, determines, based on an updated first neural network and current status information of the STA, whether to access the channel.

The current status information of the STA includes the action of the STA in a past period of time, the carrier sense result, and the packet transmission result.

In an embodiment, as described above, the training result of the first neural network is the neural network parameter of the first neural network. In this case, that the STA updates the first neural network based on the training result of the first neural network indicates that the STA updates a previous neural network parameter of the first neural network to the received neural network parameter, to obtain the updated first neural network.

In another embodiment, as described above, the training result of the first neural network is the gradient of the first neural network. In this case, that the STA updates the first neural network based on the training result of the first neural network indicates that the STA performs calculation processing on the gradient to obtain the neural network parameter of the first neural network, and then replaces an original neural network parameter of the first neural network with the neural network parameter, to obtain an updated neural network parameter. A process in which the STA performs calculation processing on the gradient is represented as $q^{¢}=q+\vartheta g$, where $q^{¢}$ is the neural network parameter of the first neural network after the update, $q$ is the neural network parameter of the first neural network before the update, $\vartheta$ is learning efficiency of the first neural network, and g is the gradient.

In an embodiment, that the STA updates the first neural network based on the training result of the first neural network, and when sensing that the channel is idle, determines, based on the updated first neural network and sensed action information, whether to access the channel includes: The STA inputs the action information to the updated first neural network to output a first value and a second value, where the first value represents an expected reward obtained by accessing the channel, and the second value represents an expected reward obtained by skipping accessing the channel. The STA determines, when the first value is greater than the second value, to access the channel; or the STA determines, when the first value is less than the second value, to skip accessing the channel. For example, when sensing that the channel is idle, the STA determines, based on the first value and the second value that are output by the updated first neural network, whether to access the channel.

An example in which the first neural network of the STA is a part of the Q neural network is used to describe an embodiment in which when sensing that the channel is idle, the STA determines, based on the training result of the first neural network and the action information detected at the current moment, whether to access the channel. In this case, a structure of the first neural network of the STA is shown in FIG. 10. The STA uses, as the input of the agent network, the action information obtained by the STA by sensing the channel at the current moment, to obtain $$Q(a_t^i, 0)$$

and $$Q(a_t^i, 1),$$

namely, the first value and the second value. When $$Q(a_t^i, 0)$$

is greater than $$Q(a_t^i, 1),$$

it represents that the expected reward obtained by the STA by accessing the channel is greater, and the STA determines to access the channel; or when $$Q(a_t^i, 0)$$

is less than $$Q(a_t^i, 1),$$

it represents that the expected reward obtained by the STA by skipping accessing the channel is greater, and the STA determines to skip accessing the channel.

In this embodiment of this application, when sensing that the channel is idle, the STA may determine, based on the training result of the first neural network trained by the AP and the action information sensed by the STA at the current moment, whether to access the channel. The training result of the first neural network is also obtained by the AP by training the first neural network based on the action information of each STA. The first neural network has high predictability. Therefore, in this manner, a probability that the STA can successfully send the packet when determining to access the channel is high, that is, a probability of the channel collision is low. This can improve a system throughput, and reduce a latency of the communication system.

Figure 11:
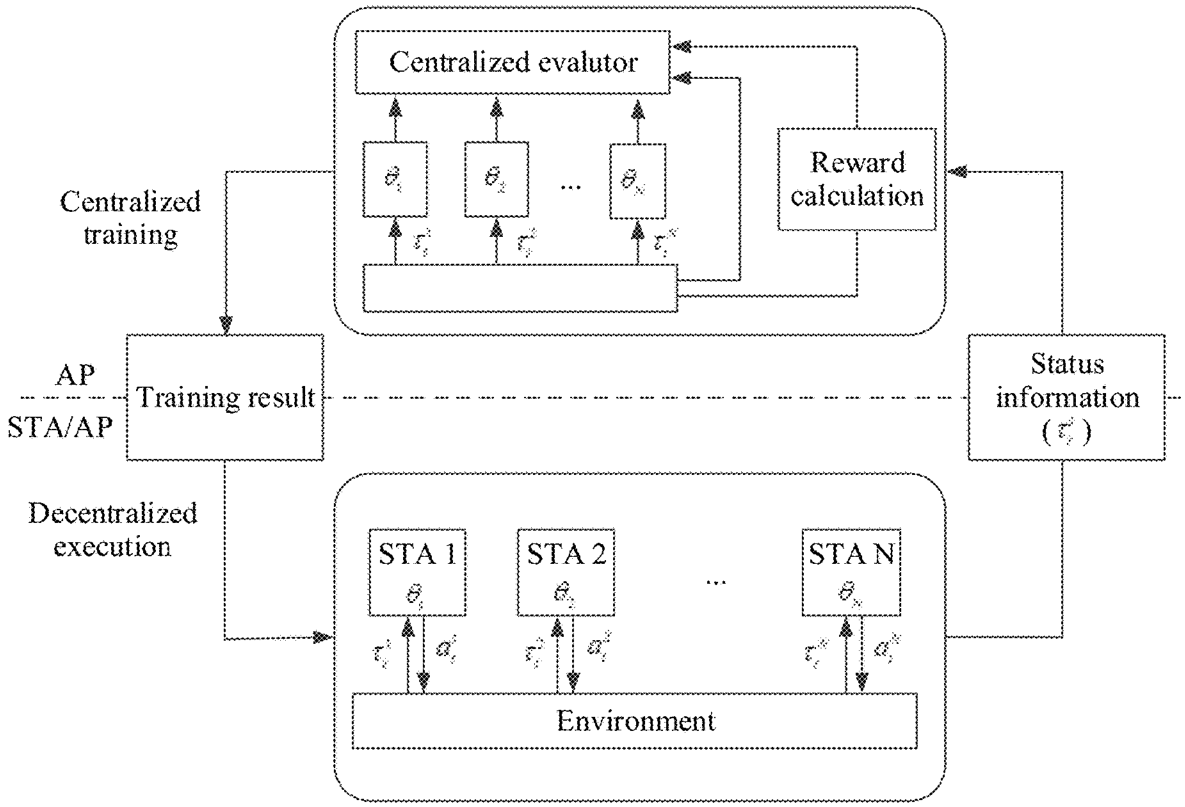
FIG. 11 is a block diagram of an embodiment of a channel access method according to an embodiment of this application.

For a block diagram of an embodiment of this embodiment of this application, refer to FIG. 11. A centralized training part corresponding to the AP and a distribution execution part corresponding to the STA are included in the implementation block diagram in FIG. 11. Both the centralized training part corresponding to the AP and the distribution execution part corresponding to the STA include the first neural network of each STA, and the neural network parameter of the first neural network is $q_i$.

Centralized training corresponding to the AP indicates that the AP trains each first neural network based on the N pieces of status information obtained based on the N pieces of action information reported by the N STAs, to obtain the training result of each first neural network. In other words, the training result of each first neural network is obtained based on the N pieces of action information. This can improve predictability of the first neural network. Each piece of action information is obtained by each STA by observing a historical environment.

Decentralized execution corresponding to each STA indicates that after each STA obtains the training result of the first neural network delivered by the AP, the STA updates the first neural network of the STA by using the training result, and then when sensing that the channel is idle, the STA determines, by the STA based on the sensed action information and the updated first neural network, whether to access the channel. In a manner in which the STA determines, based on the updated first neural network, whether to access the channel, the STA can determine, more accurately, whether to access the channel. This can improve the system throughput and reduce the system communication latency.

It may be understood that this embodiment of this application is applicable to all multi-agent reinforcement learning algorithms executed by centralized training distributions, for example, an Aho-Corasick automaton algorithm, a proximal policy optimization (PPO) algorithm, and a multi-agent deep deterministic policy gradient (MADDPG) algorithm.

In this embodiment of this application, the N STAs report the action information to the AP. The AP determines the training result of the first neural network of each STA based on the N pieces of action information reported by the N STAs, and sends the training result of the first neural network of each STA to the corresponding STA, so that each STA can update the first neural network based on the training result of the first neural network, and when sensing that the channel is idle, determine, based on the updated first neural network and the sensed action information, whether to access the channel. The AP trains the first neural network of each STA based on the N pieces of action information, so that the first neural network has better predictability, thereby helping improve the capability of each STA to predict channel access behavior of another STA. That is, when each STA sends the packet, the probability of the channel collision of the STA is lower. This improves the system throughput and reduces the communication latency.

In addition, compared with an embodiment in a current research in which the STA trains the neural network of the STA based on historical action information of all STAs in a network, in this embodiment of this application, each STA independently determines, based on the training result of the first neural network delivered by the AP and the historical action information sensed by the STA, whether to access the channel, without depending on action information of another STA other than the STA. Therefore, actual operability of each STA is better.

In the current research, each STA may further train the neural network of the STA, and report, to the AP, a neural network parameter obtained through training. Then, the AP processes neural network parameters of all the STAs to obtain new neural network parameters, and broadcasts the new neural network parameter to each STA. Then, the STA determines, based on the new neural network parameter, whether to access a channel. Compared with that in the research, in this embodiment of this application, the neural network of each STA is centrally trained by the AP, and each STA in the network does not need to train the neural network of the STA, that is, each STA in the network does not need to have a capability of independently training the neural network. This can reduce interaction between each STA and the AP, and reduce signaling overheads and a computing capability of the system.

Figure 12:
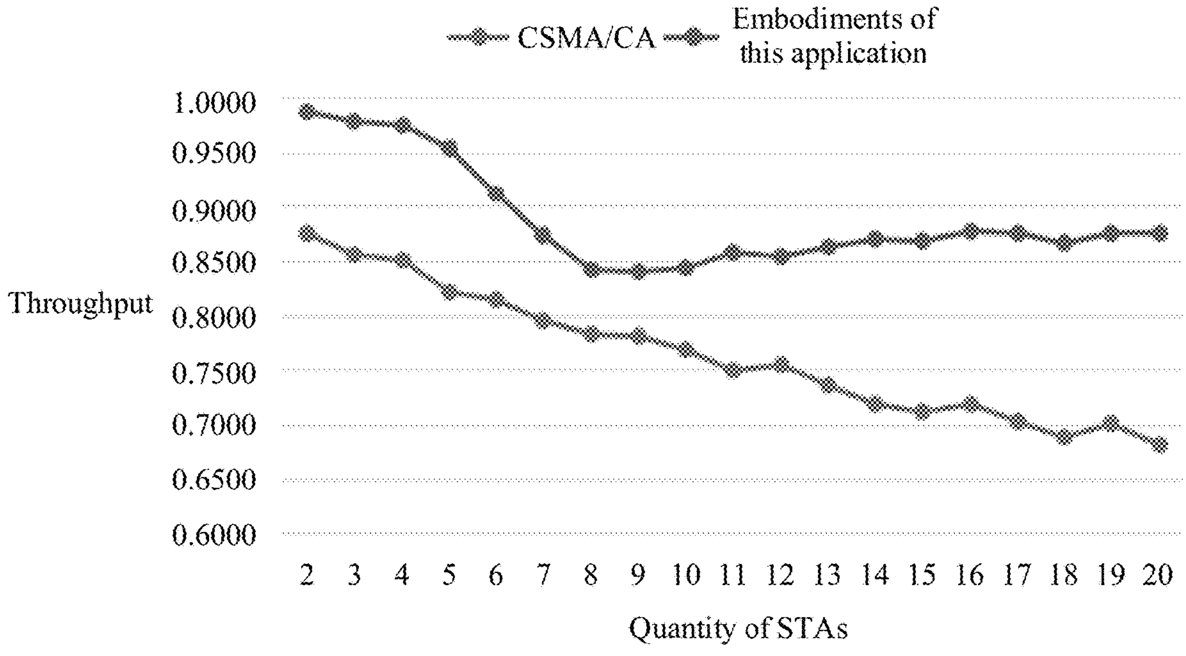
FIG. 12 is a schematic diagram of comparison between system throughputs according to an embodiment of this application.
Figure 13:
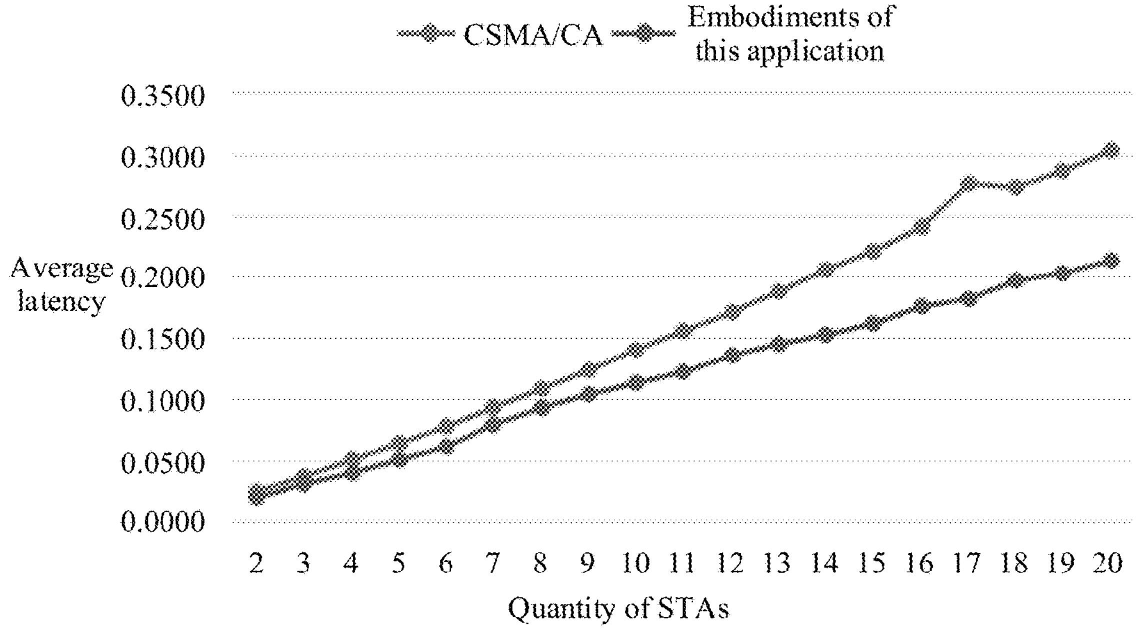
FIG. 13 is a schematic diagram of comparison between system average latencies according to an embodiment of this application.
Figures 14, 15:
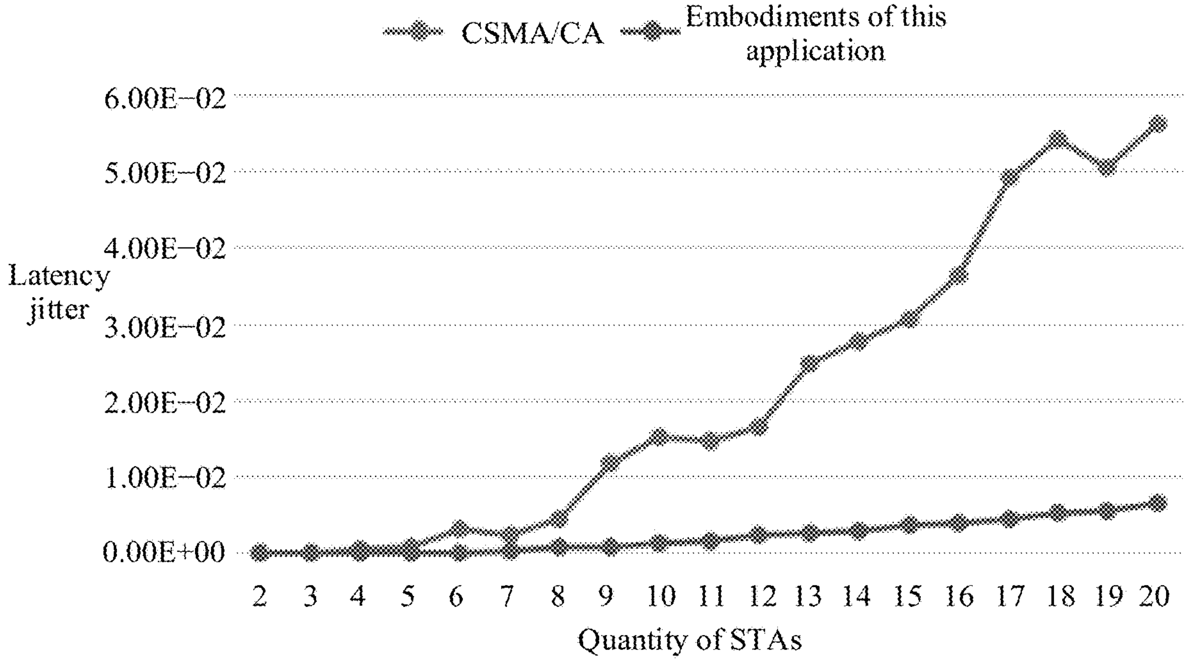
FIG. 14 is a schematic diagram of comparison between system latency jitters according to an embodiment of this application.
FIG. 15 is a schematic diagram of still another frame structure according to an embodiment of this application.

FIG. 12 is a diagram of comparison between the system throughput in this embodiment of this application and a system throughput when a channel collision is resolved by using a CSMA/CA technology. The system throughput in this embodiment of this application is higher than the throughput when the channel collision is resolved by using the CSMA/CA technology. FIG. 13 is a diagram of comparison between an average latency of the system in this embodiment of this application and an average latency of the system when the channel collision is resolved by using the CSMA/CA technology. The average latency in this embodiment of this application is lower than the average latency when the channel collision is resolved by using the CSMA/CA technology. FIG. 14 is a diagram of comparison between a latency jitter of the system in this embodiment of this application and a latency jitter of the system when the channel collision is resolved by using the CSMA/CA technology. The latency jitter in this embodiment of this application is lower than the latency jitter when the channel collision is resolved by using the CSMA/CA technology.

4. Each STA Reports the Action Information and the Carrier Sense Result Information, or each STA Reports the Action Information and the Packet Transmission Result Information.

It may be understood that, in addition to reporting the action information, each STA may also report the carrier sense result information or the packet transmission result information. Example embodiments are as follows:

1. Each STA Reports the Action Information and the Carrier Sense Result Information.

In other words, in addition to the action information, each STA also reports the carrier sense result information. The carrier sense result information includes a carrier sense result of each of a plurality of slots within the current moment after the STA successfully reports the action information last time. The AP receives the action information and the carrier sense result information that are separately reported by the N STAs.

In this case, the N pieces of action information and the N pieces of carrier sense result information are carried in action details fields of first frames reported by the STAs. A frame structure of the first frame is shown in FIG. 5. Details are not described again. The action details field includes a time indication subfield, and a data 1 subfield to a data T subfield, where T is a positive integer. The time indication subfield indicates a moment at which the STA successfully receives first response information last time. The first response information is response information sent when the AP successfully receives the action information sent by the STA. In this case, the time indication subfield indicates a moment at which the STA successfully reports the action information last time.

The data 1 subfield indicates a carrier sense result and an action performed in a first slot after the STA successfully receives the first response information last time. The data T subfield indicates a carrier sense result and an action performed in a $T^{th}$ slot after the STA successfully receives the first response information last time. It may be understood that the data 1 subfield indicates the carrier sense result and the action performed in the first slot since the STA successfully reports the action information last time. The data T subfield indicates the carrier sense result and the action performed in the $T^{th}$ slot since the STA successfully reports the action information last time.

The foregoing S103 in which the AP determines the training result of the first neural network of each STA based on the N pieces of action information may be as follows: The AP determines the training result of the first neural network of each STA based on the N pieces of action information and the N pieces of carrier sense result information. It may be understood that the AP does not need to determine carrier sense result information based on the action information, and may directly determine the training result of the first neural network of the STA based on the received action information and the received carrier sense result information. This reduces processing complexity of the AP.

In an embodiment, the foregoing S103 in which the AP determines the training result of the first neural network of each STA based on the N pieces of action information may be as follows: The AP determines the training result of the first neural network of each STA based on the N pieces of action information and the N pieces of carrier sense result information determined based on the N pieces of action information. In other words, in this embodiment, even if the STA reports the carrier sense result information, the AP may still determine the training result of the first neural network based on the carrier sense result information determined based on the action information.

2. Each STA Reports the Action Information and the Packet Transmission Result Information.

In other words, in addition to the action information, each STA also reports the packet transmission result information. The packet transmission result information includes packet transmission results obtained when the STA sends packets in a plurality of slots within a current moment after the STA successfully reports the action information last time. The AP receives the action information and the carrier sense result information that are separately reported by the N STAs.

In this case, the N pieces of action information and N pieces of packet transmission result information are carried in action details fields of first frames reported by the STAs. A frame structure of the first frame is shown in FIG. 5. Details are not described again. The action details field includes a time indication subfield, and a data 1 subfield to a data T subfield, where T is a positive integer. The time indication subfield indicates a moment at which the STA successfully receives first response information last time. The first response information is response information sent when the AP successfully receives the action information sent by the STA. In this case, the time indication subfield indicates a moment at which the STA successfully reports the action information last time.

The data 1 subfield indicates a packet transmission result and an action performed in a first slot after the STA successfully receives the first response information last time. The data T subfield indicates a packet transmission result and an action performed in a $T^{th}$ slot after the STA successfully receives the first response information last time. It may be understood that the data 1 subfield indicates the packet transmission result and the action performed in the first slot since the STA successfully reports the action information last time. The data T subfield indicates the packet transmission result and the action performed in the $T^{th}$ slot since the STA successfully reports the action information last time.

The foregoing S103 in which the AP determines the training result of the first neural network of each STA based on the N pieces of action information may be as follows: The AP determines the training result of the first neural network of each STA based on the N pieces of action information and the N pieces of packet transmission result information. It may be understood that the AP does not need to determine packet transmission result information based on the action information, and may directly determine the training result of the first neural network of the STA based on the received action information and the received packet transmission result information. This reduces processing complexity of the AP.

In an embodiment, the foregoing S103 in which the AP determines the training result of the first neural network of each STA based on the N pieces of action information may be as follows: The AP determines the training result of the first neural network of each STA based on the N pieces of action information and the N pieces of packet transmission result information determined based on the N pieces of action information. In other words, in this embodiment, even if the STA reports the packet transmission result information, the AP may still determine the training result of the first neural network based on the packet transmission result information determined based on the action information.

It may be understood that when each STA reports the action information and the carrier sense result information, or reports the action information and the packet transmission result information, a manner in which the AP processes the N pieces of action information and the N pieces of carrier sense result information or the N pieces of action information and the N pieces of packet transmission result information that are reported by the N STAs is the same as a processing manner in the channel access method 100. Details are not described again. For example, when each STA reports the action information and the carrier sense result information, in S103, the status information of the STA is obtained based on the action information and the carrier sense result information of the STA, the neural network parameter of the second neural network is obtained based on the N pieces of action information and the N pieces of carrier sense result information, and the reward function is determined based on the N pieces of action information and the N pieces of carrier sense result information.

5. Implementations in which the AP Delivers the Training Result of the First Neural Network to Each STA.

When the neural network parameters of the first neural networks corresponding to the N STAs are the same or different, implementations in which the AP delivers the training result of the first neural network to each STA may be different. The following describes several embodiments in which the AP delivers the training results of the first neural networks to the N STAs.

1. The N STAs Share the Neural Network Parameter.

It may be understood that when the N STAs share the neural network parameter, that the AP sends the training result of the first neural network of each STA to the corresponding STA is as follows: The AP broadcasts the training results of the first neural networks to the N STAs.

In other words, when the neural network parameter of the first neural network of each STA is the same, the training result, of each first neural network, determined by the AP based on the action information reported by the N STAs is also the same. For example, the AP determines the training result of one first neural network based on the action information reported by the N STAs. The AP can deliver, through multicasting, the determined training results of the first neural networks to the N STAs. This can reduce system overheads.

2. S STAs in the N STAs Share the Neural Network Parameter.

It may be understood that the S STAs in the N STAs share the neural network parameter, and S is a positive integer less than or equal to N. In this case, that the AP sends the training result of the first neural network of each STA to the corresponding STA is as follows: The AP multicasts the training results of the first neural networks corresponding to the S STAs to the S STAs, and unicasts the training results of (N-S) first neural networks to the corresponding STAs.

In other words, when some STAs in the N STAs share the neural network parameter, and the other STAs do not share the neural network parameter, the AP delivers, through multicasting to some STAs, the training results of the first neural networks of the STAs that share the neural network parameter, and unicasts, to the corresponding STAs, the training results of the first neural networks of the STAs that do not share the neural network parameter. This manner can also reduce system overheads.

3. The N STAs do not Share the Neural Network Parameter.

It may be understood that, when the neural network parameters of the N first neural networks corresponding to the N STAs are different, the training results of the first neural networks that are determined by the AP based on the information reported by the N STAs are also different. Therefore, the training results of the first neural networks are unicast to the corresponding STAs.

In an embodiment, each STA may report, to the AP, information indicating whether the STA and another STA share the neural network parameter, so that the AP can determine, based on the indication information reported by the STA, whether some STAs or all of the N STAs share the neural network parameter, and further determine an embodiment of delivering the training result of the first neural network to each STA.

In an embodiment, before each STA reports the action information, or before the AP sends the training result of each first neural network to the corresponding STA, the AP delivers a structure of the first neural network of each STA to each STA, so that each STA obtains the structure of the first neural network of the STA.

In another embodiment, the first neural network of each STA is predefined by the AP. For example, each STA knows a structure of the first neural network of the STA and the neural network parameter of the first neural network in advance, and the AP does not need to notify each STA by using signaling. This can reduce signaling overheads of the AP.

In still another embodiment, before each STA reports the action information, or before the AP sends the training result of each first neural network to the corresponding STA, the AP delivers structures of a plurality of first neural networks to each STA. When determining to use a structure of a first neural network, the STA reports the determined structure of the first neural network to the AP, so that the AP obtains a structure of the first neural network used by each STA. In this manner, each STA can flexibly select, from the structures of the plurality of first neural networks delivered by the AP, the structure of the first neural network used by the STA.

In this embodiment of this application, each STA may request the AP to update the training result of the first neural network of the STA; and when receiving request information from the STA, the AP may send the training result of the first neural network of the STA to the STA.

For the training results of the first neural networks of the N STAs, the training result of each first neural network is carried in a second frame. For a frame structure of the second frame, refer to FIG. 15. The second frame includes an element ID subfield, a length subfield, an element ID extension subfield, and the training result (neural network parameters or gradients). The second frame may be an existing management frame, or may be a newly added management frame. An example may be similar to the embodiment of the first frame. Details are not described again.

6. Communication Apparatus

To implement functions in the method provided in embodiments of this application, the AP or the STA may include a hardware structure and/or a software module, to implement the foregoing functions by using the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

Figure 16:
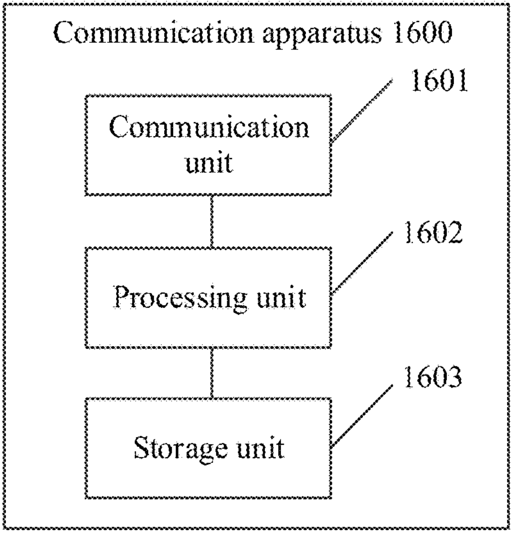
FIG. 16 is a schematic diagram of a structure of a communication apparatus according to an embodiment of this application.

As shown in FIG. 16, an embodiment of this application provides a communication apparatus 1600. The communication apparatus 1600 may be a component (for example, an integrated circuit or a chip) of an AP, or may be a component (for example, an integrated circuit or a chip) of a STA.

Alternatively, the communication apparatus 1600 may be another communication unit, configured to implement the method in method embodiments of this application. The communication apparatus 1600 may include a communication unit 1601 and a processing unit 1602. In an embodiment, the apparatus may further include a storage unit 1603.

In an embodiment, one or more units in FIG. 16 may be implemented by one or more processors, may be implemented by one or more processors and memories, may be implemented by one or more processors and transceivers, or may be implemented by one or more processors, memories, and transceivers. This is not limited in this embodiment of this application. The processor, the memory, and the transceiver may be disposed separately, or may be integrated.

The communication apparatus 1600 has a function of implementing the AP described in embodiments of this application. In an embodiment, the communication apparatus 1600 has a function of implementing the STA described in embodiments of this application. For example, the communication apparatus 1600 includes a module or a unit or a means corresponding to performing the operations of the AP in embodiments of this application by the AP. The function or the unit or the means may be implemented by software, or may be implemented by hardware, or may be implemented by hardware executing corresponding software, or may be implemented in a combination of software and hardware. For details, refer to the corresponding descriptions in the foregoing corresponding method embodiment.

In an embodiment, the communication apparatus 1600 may include:

the communication unit 1601, configured to receive action information separately reported by N stations STAs, where N pieces of action information are used to determine a training result of a first neural network of each STA, and N is a positive integer; and the processing unit 1602, configured to determine the training result of the first neural network of each STA based on the N pieces of action information, where the communication unit 1601 is further configured to send the training result of the first neural network of each STA to the corresponding STA.

In an embodiment, the action information indicates an action of a period of time, and the action is sending or skipping sending.

In an embodiment, the communication unit 1601 is further configured to receive carrier sense result information or packet transmission result information separately reported by the N STAs; and when determining the training result of the first neural network of each STA based on the N pieces of action information, the processing unit 1602 is configured to: determine the training result of the first neural network of each STA based on the N pieces of action information and the N pieces of carrier sense result information; or determine the training result of the first neural network of each STA based on the N pieces of action information and the N pieces of packet transmission result information.

In an embodiment, the training result is a neural network parameter or a gradient, and the neural network parameter/gradient is used by the corresponding STA to update the corresponding first neural network.

In an embodiment, the action information is carried in an action details field of a first frame reported by the STA. The action details field includes a time indication subfield, and a data 1 subfield to a data T subfield, where T is a positive integer.

The time indication subfield indicates a moment at which the STA successfully receives first response information last time. The first response information is response information sent when an AP successfully receives action information sent by the STA. The data 1 subfield indicates an action performed in a first slot after the STA successfully receives the first response information last time. The data T subfield indicates an action performed in a $T^{th}$ slot after the STA successfully receives the first response information last time.

In another embodiment, the action information is carried in an action details field of a first frame reported by the STA. The action details field includes a time indication subfield, an action 1 subfield, a time 1 subfield, . . . , an action P subfield, and a time P subfield, where P is a positive integer.

The time indication subfield indicates a moment at which the STA successfully receives first response information last time. The first response information is response information sent when an AP successfully receives action information sent by the STA. The action 1 subfield indicates a first action after the STA successfully receives the first response information last time. The time 1 subfield indicates duration of the action 1 or end time of the action 1. The action P subfield indicates a $P^{th}$ action between a moment at which the STA successfully receives the first response information last time and a current moment. The time P subfield indicates duration of the action P or end time of the action P.

In still another embodiment, the action information is carried in an action details field of a first frame reported by the STA. The action details field includes a time 1 indication subfield, an action 1 subfield, . . . , a time P indication subfield, and an action P subfield, where P is a positive integer.

The time 1 indication subfield indicates start time of an action 1. The action 1 subfield indicates a first action after the STA successfully receives first response information last time. The first response information is response information sent when an AP successfully receives action information sent by the STA. The time P indication subfield indicates start time of an action P. The action P subfield indicates a $P^{th}$ action between a moment at which the STA successfully receives the first response information last time and a current moment.

In yet another embodiment, the action information is carried in an action details field of a first frame reported by the STA. The action details field includes a time 1 indication subfield, a duration 1 subfield, . . . , a time K indication subfield, and a duration K subfield, where K is a positive integer.

The time 1 indication subfield indicates start time/end time of an action 1. The action 1 is a sending action when the STA sends a packet for the first time and does not receive second response information after successfully receiving first response information last time. The first response information is response information sent when an AP successfully receives action information sent by the STA. The second response information is response information sent when the AP successfully receives the packet sent by the STA. The duration 1 subfield indicates duration of the action 1.

The time K indication subfield indicates start time/end time of an action K. The action K is a sending action when the STA sends a packet for the $K^{th}$ time and does not receive the second response information after successfully receiving the first response information last time. The duration K subfield indicates duration of the action K.

In still yet another embodiment, the action information is carried in an action details field of a first frame reported by the STA. The action details field includes a first time 1 indication subfield, a second time 1 indication subfield, . . . , a first time K indication subfield, and a second time K indication subfield, where K is a positive integer.

The first time 1 indication subfield indicates start time of an action 1. The action 1 is a sending action when the STA sends a packet for the first time and does not receive second response information after successfully receiving first response information last time. The first response information is response information sent when an AP successfully receives action information sent by the STA. The second response information is response information sent when the AP successfully receives the packet sent by the STA. The second time 1 indication subfield indicates end time of the action 1.

The first time K indication subfield indicates start time of an action K. The action K is a sending action when the STA sends a packet for the $K^{th}$ time and does not receive the second response information after successfully receiving the first response information last time. The second time K indication subfield indicates end time of the action K.

In a further embodiment, the action information and the carrier sense result information are carried in an action details field of a first frame reported by the STA. The action details field includes a time indication subfield, and a data 1 subfield to a data T subfield, where T is a positive integer.

The time indication subfield indicates a moment at which the STA successfully receives first response information last time. The first response information is response information sent when an AP successfully receives action information sent by the STA.

The data 1 subfield indicates a carrier sense result and an action performed in a first slot after the STA successfully receives the first response information last time. The data T subfield indicates a carrier sense result and an action performed in a $T^{th}$ slot after the STA successfully receives the first response information last time.

In a still further embodiment, the action information and the packet transmission result information are carried in an action details field of a first frame reported by the STA. The action details field includes a time indication subfield, and a data 1 subfield to a data T subfield, where T is a positive integer.

The time indication subfield indicates a moment at which the STA successfully receives first response information last time. The first response information is response information sent when an AP successfully receives action information sent by the STA.

The data 1 subfield indicates a packet transmission result and an action performed in a first slot after the STA successfully receives the first response information last time. The data T subfield indicates a packet transmission result and an action performed in a $T^{th}$ slot after the STA successfully receives the first response information last time.

In an embodiment, when determining the training result of the first neural network of each STA based on the N pieces of action information, the processing unit 1602 is configured to: input status information of each STA into the first neural network of the corresponding STA, to obtain an output of the first neural network; input the output of each first neural network into a second neural network, to obtain an output of the second neural network, where the output of the second neural network represents an expected reward within preset time; and train a third neural network based on the output of the second neural network and a reward function, and determine the training result of each first neural network by minimizing a loss function of the third neural network, where the third neural network includes each first neural network and the second neural network.

The status information of the STA is obtained based on the action information of the STA, a neural network parameter of the second neural network is obtained based on the N pieces of action information, and the reward function is determined based on the N pieces of action information.

Further, the status information of the STA is obtained based on the action information and the carrier sense result information of the STA, a neural network parameter of the second neural network is obtained based on the N pieces of action information and the N pieces of carrier sense result information, and the reward function is determined based on the N pieces of action information and the N pieces of carrier sense result information.

Alternatively, the status information of the STA is obtained based on the action information and the packet transmission result information of the STA, a neural network parameter of the second neural network is obtained based on the N pieces of action information and the N pieces of packet transmission result information, and the reward function is determined based on the N pieces of action information and the N pieces of packet transmission result information.

In an embodiment, the processing unit 1602 is further configured to: when determining, based on the N pieces of action information, that a first STA successfully sends a packet, set a value of the reward function to 1, where the first STA is a STA in the N STAs that has a longest time interval between a moment at which the second response information is successfully received last time and the current moment.

In another embodiment, the processing unit 1602 is further configured to: when determining, based on the N pieces of action information, that a second STA successfully sends a packet, set a value of the reward function to first duration minus 1, where the second STA is a STA other than a first STA in the N STAs, and the first STA is a STA in the N STAs that has a longest time interval between a moment at which the second response information is successfully received last time and the current moment; and the first duration is duration between a moment at which the second STA successfully receives the second response information last time and the current moment.

In still another embodiment, the processing unit 1602 is further configured to: when determining, based on the N pieces of action information, that M STAs in the N STAs send packets in a same slot, set a value of the reward function to −1, where M is a positive integer less than or equal to N.

In yet another embodiment, the processing unit 1602 is further configured to: when determining, based on the N pieces of action information, that none of the N STAs sends a packet in a same slot, set a value of the reward function to 0.

In an embodiment, the N STAs share a neural network parameter; and when sending the training result of the first neural network of each STA to the corresponding STA, the communication unit 1601 is configured to: broadcast the training result of the first neural network to the N STAs.

In another embodiment, S STAs in the N STAs share a neural network parameter, and S is a positive integer less than or equal to N; and when sending the training result of the first neural network of each STA to the corresponding STA, the communication unit 1601 is configured to: multicast the training results of the first neural networks corresponding to the S STAs to the S STAs, and unicast the training results of the (N-S) first neural networks to the corresponding STAs.

In still another embodiment, when the N STAs do not share a neural network parameter, the training result of each first neural network is unicast to the corresponding STA.

This embodiment of this application and the foregoing method embodiment are based on a same concept, and bring same technical effect. For a specific principle, refer to the description of the foregoing embodiment. Details are not described again.

In another embodiment, the communication apparatus 1600 may include:

the communication unit 1601, configured to report action information to an access point AP, where the action information is used to determine a training result of a first neural network of the processing unit, where the communication unit 1601 is further configured to receive the training result of the first neural network from the AP, where the training result of the first neural network is used to update the first neural network, to determine whether the processing unit accesses a channel; and the processing unit 1602, configured to: update the first neural network based on the training result of the first neural network, and when sensing that the channel is idle, determine, based on an updated first neural network and current status information of the processing unit, whether to access the channel.

In an embodiment, the action information indicates an action of a period of time, and the action is sending or skipping sending.

In an embodiment, the communication unit 1601 is further configured to: report carrier sense result information or packet transmission result information to the AP, where the carrier sense result information or the packet transmission result information is used to determine the training result of the first neural network of the processing unit.

In an embodiment, the training result is a neural network parameter or a gradient; and the neural network parameter/gradient is used by the processing unit 1602 to update the first neural network.

In an embodiment, the action information is carried in an action details field of a first frame reported by the processing unit 1602. The action details field includes a time indication subfield, and a data 1 subfield to a data T subfield, where T is a positive integer.

The time indication subfield indicates a moment at which the processing unit 1602 successfully receives first response information last time. The first response information is response information sent when the AP successfully receives action information sent by the processing unit 1602. The data 1 subfield indicates an action performed in a first slot after the processing unit 1602 successfully receives the first response information last time. The data T subfield indicates an action performed in a $T^{th}$ slot after the processing unit 1602 successfully receives the first response information last time.

In another embodiment, the action information is carried in an action details field of a first frame reported by the processing unit 1602. The action details field includes a time indication subfield, an action 1 subfield, a time 1 subfield, . . . , an action P subfield, and a time P subfield, where P is a positive integer.

The time indication subfield indicates a moment at which the processing unit 1602 successfully receives first response information last time. The first response information is response information sent when the AP successfully receives action information sent by the processing unit 1602. The action 1 subfield indicates a first action after the processing unit 1602 successfully receives the first response information last time. The time 1 subfield indicates duration of the action 1 or end time of the action 1. The action P subfield indicates a $P^{th}$ action between a moment at which the processing unit 1602 successfully receives the first response information last time and a current moment. The time P subfield indicates duration of the action P or end time of the action P.

In still another embodiment, the action information is carried in an action details field of a first frame reported by the processing unit 1602.

The action details field includes a time 1 indication subfield, an action 1 subfield, . . . , a time P indication subfield, and an action P subfield, where P is a positive integer.

The time 1 indication subfield indicates start time of an action 1. The action 1 subfield indicates a first action after the processing unit 1602 successfully receives first response information last time. The first response information is response information sent when the AP successfully receives action information sent by a STA.

The time P indication subfield indicates start time of an action P. The action P subfield indicates a $P^{th}$ action between a moment at which the processing unit 1602 successfully receives the first response information last time and a current moment.

In yet another embodiment, the action information is carried in an action details field of a first frame reported by the processing unit 1602.

The action details field includes a time 1 indication subfield, a duration 1 subfield, a time K indication subfield, and a duration K subfield, where K is a positive integer.

The time 1 indication subfield indicates start time/end time of an action 1. The action 1 is a sending action when a STA sends a packet for the first time and does not receive second response information after successfully receiving first response information last time. The first response information is response information sent when the AP successfully receives action information sent by the processing unit 1602. The second response information is response information sent when the AP successfully receives the packet sent by the processing unit 1602. The duration 1 subfield indicates duration of the action 1.

The time K indication subfield indicates start time/end time of an action K. The action K is a sending action when the processing unit 1602 sends a packet for the $K^{th}$ time and does not receive the second response information after successfully receiving the first response information last time. The duration K subfield indicates duration of the action K.

In still yet another embodiment, the action information is carried in an action details field of a first frame reported by the processing unit 1602.

The action details field includes a first time 1 indication subfield, a second time 1 indication subfield, . . . , a first time K indication subfield, and a second time K indication subfield, where K is a positive integer.

The first time 1 indication subfield indicates start time of an action 1. The action 1 is a sending action when the processing unit 1602 sends a packet for the first time and does not receive second response information after successfully receiving first response information last time. The first response information is response information sent when the AP successfully receives action information sent by the processing unit 1602. The second response information is response information sent when the AP successfully receives the packet sent by the processing unit 1602. The second time 1 indication subfield indicates end time of the action 1.

The first time K indication subfield indicates start time of an action K. The action K is a sending action when the processing unit 1602 sends a packet for the $K^{th}$ time and does not receive the second response information after successfully receiving the first response information last time. The second time K indication subfield indicates end time of the action K.

In a further embodiment, the action information and the carrier sense result information are carried in an action details field of a first frame reported by the processing unit 1602. The action details field includes a time indication subfield, and a data 1 subfield to a data T subfield, where T is a positive integer.

The time indication subfield indicates a moment at which the processing unit 1602 successfully receives first response information last time. The first response information is response information sent when the AP successfully receives action information sent by the processing unit 1602.

The data 1 subfield indicates a carrier sense result and an action performed in a first slot after the processing unit 1602 successfully receives the first response information last time.

The data T subfield indicates a carrier sense result and an action performed in a $T^{th}$ slot after the processing unit 1602 successfully receives the first response information last time.

In a still further embodiment, the action information and the packet transmission result information are carried in an action details field of a first frame reported by the processing unit 1602. The action details field includes a time indication subfield, and a data 1 subfield to a data T subfield, where T is a positive integer.

The time indication subfield indicates a moment at which the processing unit 1602 successfully receives first response information last time. The first response information is response information sent when the AP successfully receives action information sent by the processing unit 1602.

The data 1 subfield indicates a packet transmission result and an action performed in a first slot after the processing unit 1602 successfully receives the first response information last time.

The data T subfield indicates a packet transmission result and an action performed in a $T^{th}$ slot after the processing unit 1602 successfully receives the first response information last time.

In an embodiment, when updating the first neural network based on the training result of the first neural network, and when sensing that the channel is idle, determining, based on the updated first neural network and the current status information of the processing unit, whether to access the channel, the processing unit 1602 is configured to: input the current status information of the processing unit into the updated first neural network, to output a first value and a second value, where the first value represents an expected reward obtained by accessing the channel, and the second value represents an expected reward obtained by skipping accessing the channel; and when the first value is greater than the second value, determine to access the channel; or when the first value is less than the second value, determine to skip accessing the channel.

This embodiment of this application and the foregoing method embodiment are based on a same concept, and bring same technical effect. For a specific principle, refer to the description of the foregoing embodiment. Details are not described again.

Figure 17:
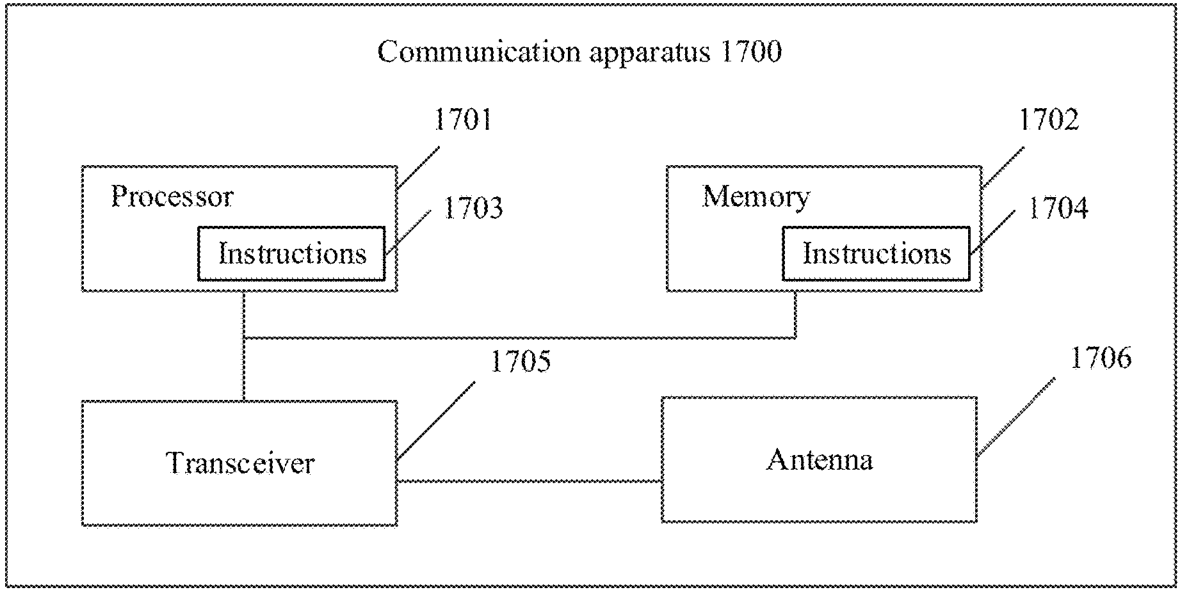
FIG. 17 is a schematic diagram of a structure of another communication apparatus according to an embodiment of this application.

An embodiment of this application further provides a communication apparatus 1700. FIG. 17 is a schematic diagram of a structure of the communication apparatus 1700. The communication apparatus 1700 may be an AP or a STA, or may be a chip, a chip system, a processor, or the like that supports the AP in implementing the foregoing method, or may be a chip, a chip system, a processor, or the like that supports the STA in implementing the foregoing method. The apparatus may be configured to implement the method described in the foregoing method embodiment. For details, refer to the descriptions in the foregoing method embodiment.

The communication apparatus 1700 may include one or more processors 1701. The processor 1701 may be a general-purpose processor, a dedicated processor, or the like. For example, the processor may be a baseband processor, a digital signal processor, an application-specific integrated circuit, a field programmable gate array or another programmable logic device, a discrete gate or a transistor logic device, a discrete hardware component, or a central processing unit (CPU). The baseband processor may be configured to process a communication protocol and communication data. The central processing unit may be configured to: control a communication apparatus (for example, a base station, a baseband chip, a terminal, a terminal chip, a DU, or a CU), execute a software program, and process data of the software program.

In an embodiment, the communication apparatus 1700 may include one or more memories 1702. The memory 1702 may store instructions 1704, and the instructions may be run on the processor 1701, so that the communication apparatus 1700 performs the method described in the foregoing method embodiment. In an embodiment, the memory 1702 may further store data. The processor 1701 and the memory 1702 may be separately disposed, or may be integrated together.

The memory 1702 may include but is not limited to a non-volatile memory such as a hard disk drive (HDD) or a solid-state drive (SSD), a random access memory (RAM), a read-only memory (ROM), an erasable programmable ROM (EPROM), or a portable memory (e.g., Compact Disc Read-Only Memory (CD-ROM)).

In an embodiment, the communication apparatus 1700 may further include a transceiver 1705 and an antenna 1706. The transceiver 1705 may be referred to as a communication unit, a transceiver machine, a transceiver circuit, or the like, and is configured to implement a transceiver function. The transceiver 1705 may include a receiver and a transmitter. The receiver may be referred to as a receiver machine, a receiver circuit, or the like, and is configured to implement a receiving function. The transmitter may be referred to as a transmitter machine, a transmitter circuit, or the like, and is configured to implement a sending function.

When the communication apparatus 1700 is the AP, the transceiver 1705 is configured to perform S102 and S104 in the channel access method 100, and the processor 1701 is configured to perform 5103 in the channel access method 100.

When the communication apparatus 1700 is the STA, the processor 1701 is configured to perform S106 in the channel access method 100, and the transceiver 1705 is configured to perform S101 and S105 in the channel access method 100.

In another embodiment, the processor 1701 may include a transceiver configured to implement receiving and sending functions. For example, the transceiver may be a transceiver circuit, an interface, or an interface circuit. The transceiver circuit, the interface, or the interface circuit configured to implement the receiving and sending functions may be separated, or may be integrated together. The transceiver circuit, the interface, or the interface circuit may be configured to read and write code/data; or the transceiver circuit, the interface, or the interface circuit may be configured to perform signal transmission or transferring.

In still another embodiment, In an embodiment, the processor 1701 may store instructions 1703, and the instructions 1703 run on the processor 1701, so that the communication apparatus 1700 performs the method described in the foregoing method embodiment. The instructions 1703 may be fixed in the processor 1701. In this case, the processor 1701 may be implemented by hardware.

In yet another embodiment, the communication apparatus 1700 may include a circuit. The circuit may implement a sending, receiving, or communication function in the foregoing method embodiment. The processor and the transceiver that are described in this embodiment of this application may be implemented on an integrated circuit (IC), an analog IC, a radio frequency integrated circuit RFIC, a hybrid signal IC, an application-specific integrated circuit (ASIC), a printed circuit board (PCB), an electronic device, or the like. The processor and the transceiver may alternatively be manufactured by using various IC technologies, for example, a complementary metal oxide semiconductor (CMOS), an N-type metal oxide semiconductor (nMetal-oxide-semiconductor, or NMOS), a P-type metal oxide semiconductor (positive channel metal oxide semiconductor, or PMOS), a bipolar junction transistor (BJT), a bipolar CMOS (BiCMOS), silicon germanium (SiGe), and gallium arsenide (GaAs).

This embodiment of this application and the method embodiment shown in the channel access method 100 are based on a same concept, and bring same technical effect. For a specific principle, refer to the description of the embodiment shown in the channel access method 100. Details are not described again.

This application further provides a computer-readable storage medium, configured to store computer software instructions. When the instructions are executed by a communication apparatus, a function in any one of the foregoing method embodiments is implemented.

This application further provides a computer program product, configured to store computer software instructions. When the instructions are executed by a communication apparatus, a function in any one of the foregoing method embodiments is implemented.

This application further provides a computer program. When the computer program is run on a computer, a function in any one of the foregoing method embodiments is implemented.

All or some of the foregoing embodiments may be implemented by using software, hardware, firmware, or any combination thereof. When software is used to implement embodiments, all or a part of embodiments may be implemented in a form of a computer program product. The computer program product includes one or more computer instructions. When the computer instructions are loaded and executed on the computer, the interaction or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a high-density digital video disc (DVD), a semiconductor medium (for example, an SSD), or the like.

The foregoing descriptions are merely example embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method of channel access by an access point (AP), the method comprising:

receiving, by the AP, action information separately reported by N stations (STAs), wherein N pieces of action information are used to determine a training result of a first neural network of each STA, and N is a positive integer;

determining, by the AP, the training result of the first neural network of each STA based on the N pieces of action information; and sending, by the AP, the training result of the first neural network of each STA to the corresponding STA, wherein the training result allows the corresponding STA to update the first neural network and access a channel when the corresponding STA has sensed that the channel is idle based on the updated first neural network and current status information of the STA.

2. The method according to claim 1, wherein the action information indicates an action of a period of time, and the action is sending or skipping sending.

3. The method according to claim 1, wherein the method further comprises:

receiving, by the AP, carrier sense result information or packet transmission result information separately reported by the N STAs; and the determining, by the AP, the training result of the first neural network of each STA based on the N pieces of action information comprises:

determining, by the AP, the training result of the first neural network of each STA based on the N pieces of action information and the N pieces of carrier sense result information; or determining, by the AP, the training result of the first neural network of each STA based on the N pieces of action information and the N pieces of packet transmission result information.

4. The method according to claim 1, wherein the training result is a neural network parameter or a gradient, and the neural network parameter or gradient is used by the STA to update the first neural network.

5. The method according to claim 1, wherein the action information is carried in an action details field of a first frame reported by the STA;

the action details field comprises a time indication subfield, and a data 1 subfield to a data T subfield, wherein T is a positive integer;

the time indication subfield indicates a moment at which the STA successfully receives first response information last time, and the first response information is response information sent when the AP successfully receives action information sent by the STA;

the data 1 subfield indicates an action performed in a first slot after the STA successfully receives the first response information last time; and the data T subfield indicates an action performed in a $T^{th}$ slot after the STA successfully receives the first response information last time.

6. The method according to claim 1, wherein the action information is carried in an action details field of a first frame reported by the STA;

the action details field comprises a time indication subfield, an action 1 subfield, a time 1 subfield, an action P subfield, and a time P subfield, wherein P is a positive integer;

the time indication subfield indicates a moment at which the STA successfully receives first response information last time, and the first response information is response information sent when the AP successfully receives action information sent by the STA;

the action 1 subfield indicates a first action after the STA successfully receives the first response information last time, and the time 1 subfield indicates duration of the action 1 or end time of the action 1; and the action P subfield indicates a $P^{th}$ action between a moment at which the STA successfully receives the first response information last time and a current moment, and the time P subfield indicates duration of the action P or end time of the action P.

7. The method according to claim 1, wherein the action information is carried in an action details field of a first frame reported by the STA;

the action details field comprises a time 1 indication subfield, an action 1 subfield, a time P indication subfield, and an action P subfield, wherein P is a positive integer;

the time 1 indication subfield indicates start time of an action 1, the action 1 subfield indicates a first action after the STA successfully receives first response information last time, and the first response information is response information sent when the AP successfully receives action information sent by the STA; and the time P indication subfield indicates start time of an action P, and the action P subfield indicates a $P^{th}$ action between a moment at which the STA successfully receives the first response information last time and a current moment.

8. A method of channel access by a station (STA), the method comprising:

reporting, by the STA, action information to an access point (AP), wherein the action information is used to determine a training result of a first neural network of the STA;

receiving, by the STA, the training result of the first neural network from the AP, wherein the training result of the first neural network is used to update the first neural network, to determine whether the STA accesses a channel;

updating, by the STA, the first neural network based on the training result of the first neural network;

sensing that the channel is idle; and determining, based on an updated first neural network and current status information of the STA, whether to access the channel.

9. The method according to claim 8, wherein the action information indicates an action of a period of time, and the action is sending or skipping sending.

10. The method according to claim 8, wherein the method further comprises:

reporting, by the STA, carrier sense result information or packet transmission result information to the AP, wherein the carrier sense result information or the packet transmission result information is used to determine the training result of the first neural network of the STA.

11. The method according to claim 8, wherein the training result is a neural network parameter or a gradient; and the neural network parameter or gradient is used by the STA to update the first neural network.

12. The method according to claim 8, wherein the action information is carried in an action details field of a first frame reported by the STA;

the action details field comprises a time indication subfield, and a data 1 subfield to a data T subfield, wherein T is a positive integer;

the time indication subfield indicates a moment at which the STA successfully receives first response information last time, and the first response information is response information sent when the AP successfully receives action information sent by the STA;

the data 1 subfield indicates an action performed in a first slot after the STA successfully receives the first response information last time; and the data T subfield indicates an action performed in a $T^{th}$ slot after the STA successfully receives the first response information last time.

13. The method according to claim 8, wherein the action information is carried in an action details field of a first frame reported by the STA;

the action details field comprises a time indication subfield, an action 1 subfield, a time 1 subfield, an action P subfield, and a time P subfield, wherein P is a positive integer;

the time indication subfield indicates a moment at which the STA successfully receives first response information last time, and the first response information is response information sent when the AP successfully receives action information sent by the STA;

the action 1 subfield indicates a first action after the STA successfully receives the first response information last time, and the time 1 subfield indicates duration of the action 1 or end time of the action 1; and the action P subfield indicates a $P^{th}$ action between a moment at which the STA successfully receives the first response information last time and a current moment, and the time P subfield indicates duration of the action P or end time of the action P.

14. The method according to claim 8, wherein the action information is carried in an action details field of a first frame reported by the STA;

the action details field comprises a time 1 indication subfield, an action 1 subfield, a time P indication subfield, and an action P subfield, wherein P is a positive integer;

the time 1 indication subfield indicates start time of an action 1, the action 1 subfield indicates a first action after the STA successfully receives first response information last time, and the first response information is response information sent when the AP successfully receives action information sent by the STA; and the time P indication subfield indicates start time of an action P, and the action P subfield indicates a $P^{th}$ action between a moment at which the STA successfully receives the first response information last time and a current moment.

15. A communication apparatus of an access point (AP), wherein the communication apparatus comprises:

a communication unit, configured to receive action information separately reported by N stations (STAs), wherein N pieces of action information are used to determine a training result of a first neural network of each STA, and N is a positive integer; and a processing unit, configured to determine the training result of the first neural network of each STA based on the N pieces of action information, wherein the communication unit is further configured to send the training result of the first neural network of each STA to the corresponding STA, wherein the training result allows the corresponding STA to update the first neural network and access a channel when the corresponding STA has sensed that the channel is idle based on the updated first neural network and current status information of the STA.

16. The apparatus according to claim 15, wherein the action information indicates an action of a period of time, and the action is sending or skipping sending.

17. The apparatus according to claim 15, wherein the communication unit is further configured to receive carrier sense result information or packet transmission result information separately reported by the N STAs; and when determining the training result of the first neural network of each STA based on the N pieces of action information, the processing unit is specifically configured to:

determine the training result of the first neural network of each STA based on the N pieces of action information and the N pieces of carrier sense result information; or determine the training result of the first neural network of each STA based on the N pieces of action information and the N pieces of packet transmission result information.

18. The apparatus according to claim 15, wherein the training result is a neural network parameter or a gradient, and the neural network parameter or gradient is used by the STA to update the first neural network.

19. The apparatus according to claim 15, wherein the action information is carried in an action details field of a first frame reported by the STA;

the action details field comprises a time indication subfield, and a data 1 subfield to a data T subfield, wherein T is a positive integer;

the time indication subfield indicates a moment at which the STA successfully receives first response information last time, and the first response information is response information sent when an AP successfully receives action information sent by the STA;

the data 1 subfield indicates an action performed in a first slot after the STA successfully receives the first response information last time; and the data T subfield indicates an action performed in a $T^{th}$ slot after the STA successfully receives the first response information last time.

20. The apparatus according to claim 15, wherein the action information is carried in an action details field of a first frame reported by the STA;

the action details field comprises a time indication subfield, an action 1 subfield, a time 1 subfield, an action P subfield, and a time P subfield, wherein P is a positive integer;

the time indication subfield indicates a moment at which the STA successfully receives first response information last time, and the first response information is response information sent when an AP successfully receives action information sent by the STA;

the action 1 subfield indicates a first action after the STA successfully receives the first response information last time, and the time 1 subfield indicates duration of the action 1 or end time of the action 1; and the action P subfield indicates a $P^{th}$ action between a moment at which the STA successfully receives the first response information last time and a current moment, and the time P subfield indicates duration of the action P or end time of the action P.

* * * * *